US008754562B2

(12) United States Patent  
Platon et al.

(10) Patent No.: US 8,754,562 B2
(45) Date of Patent: Jun. 17, 2014

(54) ELECTRICAL MACHINE WITH DUAL INSULATED COIL ASSEMBLY

(75) Inventors: Mihai C. Platon, Burnaby (CA); Eyup Mete Sireli, Vancouver (CA)

(73) Assignee: Clean Current Power Systems Incorporated, Vancouver (CA)

( * ) Notice: Subject to any disclaimer, the term of this patent is extended or adjusted under 35 U.S.C. 154(b) by 694 days.

(21) Appl. No.: 13/056,961

(22) PCT Filed: Jul. 9, 2009

(86) PCT No.: PCT/CA2009/000907
§ 371 (c)(1),
(2), (4) Date: May 3, 2011

(87) PCT Pub. No.: WO2010/012071
PCT Pub. Date: Feb. 4, 2010

(65) Prior Publication Data
US 2011/0198955 A1    Aug. 18, 2011

(30) Foreign Application Priority Data
Jul. 29, 2008 (GB) .................................. 0813792.9

(51) Int. Cl.
H03K 3/30    (2006.01)
H02K 3/44    (2006.01)

(52) U.S. Cl.
USPC ............................................ 310/215; 310/45

(58) Field of Classification Search
USPC ................................ 310/43, 45, 87, 208, 215
See application file for complete search history.

(56) References Cited

U.S. PATENT DOCUMENTS

| 2,400,576 | A | 5/1946 | Sigmund et al. |
| 2,845,551 | A | 7/1958 | Potter |
| 3,963,949 | A | 6/1976 | Church |
| 5,426,264 | A | 6/1995 | Livingston et al. |
| 6,142,707 | A | 11/2000 | Bass et al. |

(Continued)

FOREIGN PATENT DOCUMENTS

| EP | 345916 A1 * | 12/1989 | ............. H02K 44/06 |
| EP | 0 590 867 | 5/2002 | |

(Continued)

OTHER PUBLICATIONS

Mats Leijon Fredrik Owman, Stafan G. Johansson, Powerformer—The Prototype and Beyond, 2000 IEEE, Sweden.

(Continued)

Primary Examiner — Tran Nguyen
(74) Attorney, Agent, or Firm — Dean Palmer IP Law/IProperty Inc.

(57) ABSTRACT

An electrical coil assembly for use in a flooded electrical machine operating in an electrically conductive and/or chemically aggressive medium, and a method for manufacturing an electrical coil assembly, are disclosed. The electrical coil assembly incorporates an electrical cable coil winding and a magnetic core. The electrical coil winding is wound of electrical cable with dielectric insulation that is also a waterproof molecular barrier and is covered with at least one layer of waterproof adhesive material. The magnetic core is substantially surrounded with a dielectric insulation layer, which is covered with at least one layer of waterproof adhesive material. The combination of dielectric insulation and waterproof adhesive layers provide protection against the ingress of water and accordingly reduce risk of electrical fault and failure of the electrical coil assembly in submerged service.

31 Claims, 16 Drawing Sheets

(56) References Cited

U.S. PATENT DOCUMENTS

| | | | |
|---|---|---|---|
| 6,556,780 | B2 | 4/2003 | Mjelstad et al. |
| 6,633,493 | B2 | 10/2003 | Heinemann et al. |
| 6,822,363 | B2 | 11/2004 | Leijon |
| 6,972,505 | B1 | 12/2005 | Leijon et al. |
| 7,019,429 | B1 | 3/2006 | Larsson et al. |
| 7,045,912 | B2 | 5/2006 | Leijon et al. |
| 7,285,726 | B2 | 10/2007 | Bremnes |
| 7,331,762 | B2 | 2/2008 | Fraenkel |
| 2001/0040416 | A1* | 11/2001 | Nakamura et al. ............ 310/201 |
| 2003/0025584 | A1 | 2/2003 | Heinemann et al. |
| 2007/0240893 | A1 | 10/2007 | Bremnes et al. |

FOREIGN PATENT DOCUMENTS

| | | | |
|---|---|---|---|
| EP | 1 430 220 | 6/2005 | |
| GB | 2462257 A | 2/2010 | |
| GB | 2462257 B2 | 9/2010 | |
| JP | 58220416 A * | 12/1983 | .............. H01F 40/06 |
| JP | 09168250 A * | 6/1997 | .............. H02K 3/44 |
| WO | WO 2006029496 | 3/2006 | |
| WO | WO 2010012071 | 2/2010 | |

OTHER PUBLICATIONS

Mats Leijon, Mikael Dahlgren, Lars Walfridsson, Li Mong, and Albert Jaksts, A Recent Development in the Electrical Insulation Systems of Generators and Transformers, IEEE Electrical Insulation Magazine, 2000, Sweden.

Mats Leijon, Fredrick Owman, Torbjorn Sorqvist, Christer Parkegren, Sture Lindah and Thommy Karlsson, Powerformer@: A Giant Step in Powerplant Engineering, IEEE 1999.

Sverre Hvidsten, Gunnar Vegge and Jan Tore Benjaminsen, Electrical and Mechanical Properties of Semi-Conductive Sheath Materials Aged at High Temperatures in Seawater, Conference Record of the 2006 IEEE International Symposium on Electrical Insulation.

Arne Nysveen, Atle H. Bomes, Harald Kulbotten, Martin Hoyer-Hansen, and Jens Kr. Lervik, Direct Electrical Heating of Subsea Pipelines—Technology Development and Operating Experience, IEEE, Paper No. PCIC-2005-20, 2005.

Yang Kexin, Yang Dewang, Power in the Sea—the Deep-Submerged Motor, Wuhan Marine Electric Propulsion Research Institute, Wuhan 430064, China.

V. Sihvo* and J. Pyrhonen, Steam-Resistivity of Synthetic Insulation Materials Used in Low-Voltage Motors, 2007 International Conference on Solid Dielectrics, Winchester, UK, Jul. 2007.

John C. Botts and Robert D. Wolford, Water Immersion Testing of Form-Wound Coil Insulation, IEEE Transactions on Electrical Insulation, vol. Ei-4, No. 3, Sep. 1969.

R. J. Flaherty and H. P. Walker, Sea Water Flo,oded Electric Motor for 13,200 PSI, Published?

W. S. Neff, Electrical Insulation of an AC Propulsion Motor for the DEEPSTAR 20,000, Published?

Björn Bolund, Mats Leijon and Urban Lundin, Poynting Theorem applied to Cable Wound Generators, IEEE, 2008.

S. V. Nikolajevic, The Behaviour of Water in XLPE and EPR Cables and Its Influence on the Electric Characteristics of Insulation, IEEE Transactions on Power Delivery, vol. 14, No. 1, Jan. 1999.

T.Hashizume, C.Shinoda, K.Nakamura, M.Hotta, T.Tani and T.Taniguchi, A Consideration on Changes of AC Breakdown Voltages During an Accelerated Test of Immersed Dry-Cured XLPE Cables, Proceedings of the 3rd International Conference on Properties and Applications of Dielectric Materials Jul. 1991 Tokyo, Japan.

P. Anelli, A. Motori, I. Ghinello, G. Mazzanti, and G.C. Montanari, Electrical properties for diagnosis of sulfide-tree growth in cables under dc stress, IEEE Annual Report—Conference on Electrical Insulation and Dielectric Phenomena, Minneapolis, Oct. 1997.

P. Anelli, A. Motori, I. Ghinello, G. Mazzanti and G. C. Montanari, Growth Properties of Sulfide Trees in Cables under dc Stress, IEEE Transactions on Dielectrics and Electrical Insulation vol. 4 No. 6, Dec. 1997.

Minkyu Kim, Robert E. Hebner, and Gary A. Hallock, Modeling the Growth of Streamers during Liquid Breakdown, IEEE Transactions on Dielectrics and Electrical Insulation vol. 15, No. 2; Apr. 2008.

J. Qian, R. P. Joshi, K. H. Schoenbach, M. Laroussi, E. Schamiloglu and C. Christodoulou, Percolative Model of Electric Breakdown in Liquid Dielectrics, Published?

W. Frey, R Straessner, W. Edinger, H. Bluhm, Experimental Results on the Breakdown Behaviour of Concrete Immersed in Water, IEEE 2002.

Silvano Buogo and Giovanni B. Cannelli, Implosion of an underwater spark-generated bubble and acoustic energy evaluation using the Rayleigh model, Journal of the Acoustical Society of America, Jun. 2002.

U.S. Army Corps of Engineers, Painting: New Construction and Maintenance, Manual No. 1110-2-3400, Department of the Army, Apr. 30, 1995.

Paige, Specification regarding DLO & Industrial Motor Lead Cable Insulation: (EPR) Ethylene Propylene Rubber Sizes: 16AWG-1111 MCM, 600/1000/2000 Volts, 90° C.

MWS Wire Industries, Magnetic Wire Product Brochure, available at www.mwswire.com, 2005.

AK Steel Corporation, Product Data Bulletin, Selection of Electrical Steels for Magnetic Cores, Product Brochure, available at www.aksteel.com, 2007.

Hempel, Product Data Sheet for HEMPADUR® 17630 Curing Agent 97330.

3M Electrical Products Division, Scotchcast™ 2130 Electrical Insulating Resin Data Sheet, USA 1999.

3M Corrosion Protection Department, Scotchcast™ Electrical Resin 5555 One-Part, Motor, Transformer, Coil Insulating Epoxy Resin Data Sheet, USA 2002.

E. Mete Sireli, Hempel 1763- and 4575-Paint Adhesion Tests on Various Materials and Surface Finishes, Apr. 2008.

* cited by examiner

ELECTRICAL MACHINE WITH DUAL INSULATED COIL ASSEMBLY

RELATED APPLICATIONS

This application is a national phase entry of PCT International Patent Application No. PCT/CA2009/000907 filed Jul. 9, 2009, and published as WO 2010/012071 A1, which claims priority of GB Patent Application No. 0813792.9 filed Jul. 29, 2008.

The contents of all applications listed above are incorporated herein by reference.

TECHNICAL FIELD

The present invention relates generally to electrical machines comprising multiple electrical coil assemblies, and methods of manufacturing thereof. More specifically, electrical machines comprising electrical coil assemblies with multiple layers of insulation providing for protection against electrical faults, and for improved longevity and reliability, are disclosed.

BACKGROUND

It is known in the art of electrical machines, and particularly in the field of electrical generators and motors, that the use of energized electrical coil windings and non-energized iron magnetic core elements in relatively close proximity to each other as components of an electrical coil assembly gives rise to the risk of electric faults, such as faults between the coil windings and the iron magnetic core or faults between the turns or layers within the coil windings. Consequently, it is known that an effective method for protecting the coil windings and the magnetic core from faults is critical to reducing the risk of such electric faults, and therefore the use of conventional electrical insulating or dielectric materials on one or both of the coil windings and magnetic core is well established in electrical generators, motors and other electrical machines according to the prior art. In one such conventional design for an electrical generator or motor for use in dry service, a resin or enamel dielectric material is applied to the magnetic core, and an enamel dielectric material is applied to the magnetic wire of the coil windings in order to reduce the risk of electrical faults between the coil windings and magnetic core, or within the coil windings.

It is also known to use electrical cable for the coil windings in an electrical machine, such as a generator or motor, to provide insulation between the coil windings and magnetic core, and within the coil windings. The use of electrical cable for coil windings to allow high voltage operation of the coil windings has been shown in the electrical generators of U.S. Pat. No. 6,927,505 to Leijon et al., and U.S. Pat. No. 7,019,429 to Larsson et al., for example, which disclose the use of electrical cable comprising layers of polyethylene and semiconductor dielectric insulation for the generator coil windings.

The risk of electric fault in an electrical machine such as a generator or motor is substantially increased upon exposure of the coil windings and magnetic core to a conductive and/or chemically aggressive environment such as seawater. It is well understood that the small size of water molecules and their interaction with the electrical field around the energized coil windings create a significant challenge in preventing the electrical breakdown of many known types and combinations of dielectric insulation materials in an operating environment with exposure to seawater. The coupled electrochemical and dielectric stresses in such an operating environment lead to premature aging and electrical breakdown of dielectric insulation materials used in conjunction with both magnetic core and coil windings of conventional electrical machines, and can ultimately lead to faults and premature failure of the coil assembly.

In particular, known design approaches for providing protection against electrical coil assembly faults in electric machines subject to frequent wetting, spray and/or immersion (total or partial) in an electrically conductive and/or chemically aggressive environment, such as seawater or chemical solution, are limited in their effectiveness. Existing design approaches for protection of electrical machines in immersion service have included:

use of a liquid insulation medium, such as oil, as a barrier between the conductive environment and the electrical coil assembly, resulting in differential pressures between the liquid insulation medium and surrounding environment and requiring reliance on seals to contain the liquid insulation medium, which are susceptible to breakdown and leakage over prolonged immersion use, and risks the release of the liquid insulation medium and failure of the electrical coil assembly should such seals leak, or should the liquid insulation material degrade over time; and isolation of the entire electrical machine or at least a portion including the electrical coil assembly in a watertight compartment utilizing mature sealing technology, which remains potentially susceptible to leakage of such seals and accompanying risk of electrical coil assembly failure over prolonged immersion use and may be impractical in many applications due to the bulk and complexity of a watertight enclosure, and the regular maintenance required by many sealing technologies.

SUMMARY

It is an object of the present invention to provide an electrical coil assembly for flooded use in an electrical machine operating in an electrically conductive and/or chemically aggressive medium that addresses some of the limitations of the prior art.

Another object of the present invention is to provide a method of manufacturing an electrical coil assembly for flooded operation in an electrically conductive and/or chemically aggressive medium that addresses some of the limitations of the prior art.

An embodiment of the present invention is based on the use of both dielectric and waterproof insulation in specific layers and configurations to ensure optimum protection of electrical coil assemblies including coil windings and magnetic core components from water ingress, electrical breakdown, electrical fault and ultimately failure. According to an aspect of the present invention, certain objects of the invention may be satisfied by providing electrical cable coil windings comprising dielectric insulation which comprises a waterproof molecular barrier material layer around the full length of the energized electrical conductor in the coil windings to provide electrical insulation from faults, and by further providing multiple waterproof adhesive material layers surrounding the magnetic core and coil windings to provide protection against ingress of water towards the magnetic core and energized electrical conductor in the coil windings.

A further object of the present invention is to provide an electrical machine configured for flooded operation in an electrically conductive medium, comprising at least one coil assembly with at least one magnetic core element having at least one first dielectric insulation layer surrounding the core element, and at least one waterproof adhesive layer surrounding the dielectric insulation layer; and at least one electrical winding around the magnetic core element, the electrical winding having at least one continuous length of flexible electrical cable including a central conducting element and at least one second dielectric insulation layer surrounding the central conducting element, wherein the second dielectric insulation layer includes at least one waterproof molecular barrier material; and at least one waterproof adhesive layer applied on top of and adhering to the flexible electrical cable.

Additionally, the at least one electrical winding of the electrical machine may include multiple winding layers, and each winding layer may comprise a continuous length of electrical cable. Further, such multiple winding layers may be connected in parallel within the electrical machine.

Another object of the present invention is to provide an electrical coil assembly configured for flooded operation in an electrical machine, transformer or inductor, in an electrically conductive medium, including at least one magnetic core element having at least one first dielectric insulation layer surrounding the core element, and at least one waterproof adhesive layer surrounding the first dielectric insulation layer; at least one electrical winding around the magnetic core element including at least one continuous length of flexible electrical cable including a central conducting element and at least one second dielectric insulation layer surrounding the conducting element, wherein the second dielectric insulation layer includes at least one waterproof molecular barrier material; and at least one waterproof adhesive layer applied on top of and adhering to the flexible electrical cable.

Yet a further object of the present invention is to provide a method of manufacturing an electrical coil assembly for flooded operation in an electrically conductive medium, comprising:

providing a magnetic core comprising a plurality of laminae of ferromagnetic material;

coating the magnetic core with at least one layer of dielectric insulating material;

coating the dielectric insulating material with at least one layer of waterproof adhesive material;

winding an electrical winding around the magnetic core, the electrical winding including an electrical cable comprising a conductor, and at least one layer of dielectric insulation surrounding the conductor, wherein the dielectric insulation includes at least one waterproof molecular barrier material; and coating the electrical winding and the magnetic core with at least one layer of waterproof adhesive material.

Further advantages of the invention will become apparent when considering the drawings in conjunction with the detailed description.

BRIEF DESCRIPTION OF THE DRAWINGS

The apparatus and method of the present invention will now be described with reference to the accompanying drawing figures, in which:

FIG. 5A is a cross sectional view of a multiphase power conduit in the electrical machine of FIG. 5 according to an embodiment of the invention.

DETAILED DESCRIPTION

Figure 1:
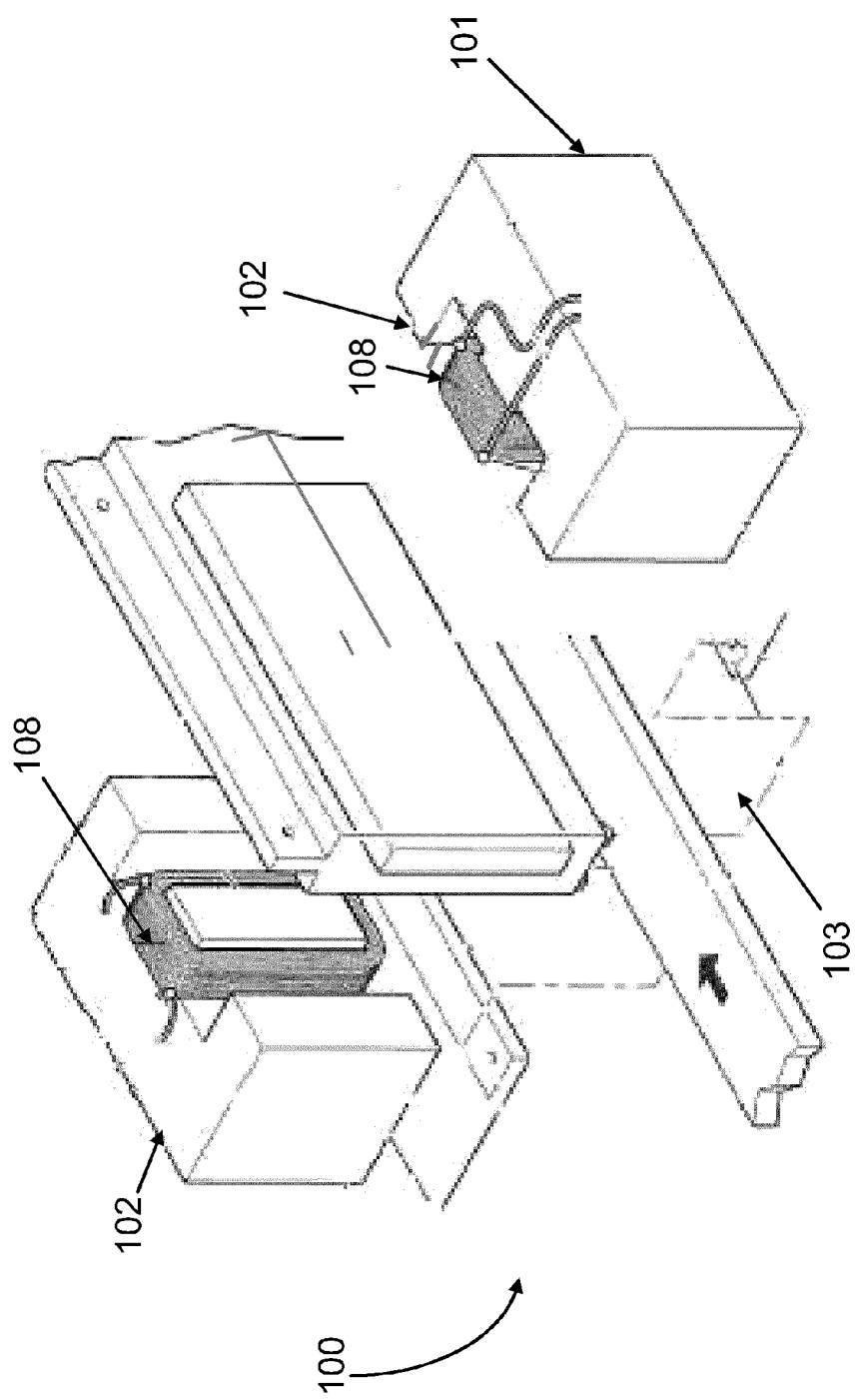
FIG. 1 is a perspective view of a portion of an electrical machine with one or more electrical coil assemblies constructed in accordance with the prior art.

Referring to FIG. 1, a perspective view of a portion of an electrical machine with one or more electrical coil assemblies constructed in accordance with the prior art is shown for reference purposes. The conventional electrical machine 100 comprises multiple electrical coil assemblies 101 attached to and arranged around a dual-sided stator structure 103, with a central magnetic rotor structure 109 located between and rotating relative to the two sides of the stator structure 103. The exemplary electrical machine 100 is configured as a dual sided axial flux electrical machine, such as may be used in an electrical generator, or motor, for example, according to the prior art.

Each conventional electrical coil assembly 101 in the conventional electrical machine 100 comprises a magnetic core 102 and an electrical winding 108. The magnetic core 102 may typically be constructed out of any suitable ferromagnetic material, such as electrical steel for example, which is commonly arranged in multiple substantially parallel laminae to form the magnetic core structure 102. The electrical winding 108 is wound around at least a portion of the magnetic core 102. Typically, the electrical winding 108 comprises an electrical conductor surrounded by a dielectric coating, such as conventional enamel-coated copper magnetic wire, for example. Further, each electrical winding 108 in the conventional electrical coil assembly 101 is wound individually, such that multiple independently wound coil assemblies 101 must be connected together in series and/or parallel connection by means of electrical connectors (such as welds, splices, mechanical lugs and other suitable types of electrical connectors) to form one or more electrical circuits in the conventional stator structure 103 of the electrical machine 100.

Figure 2:
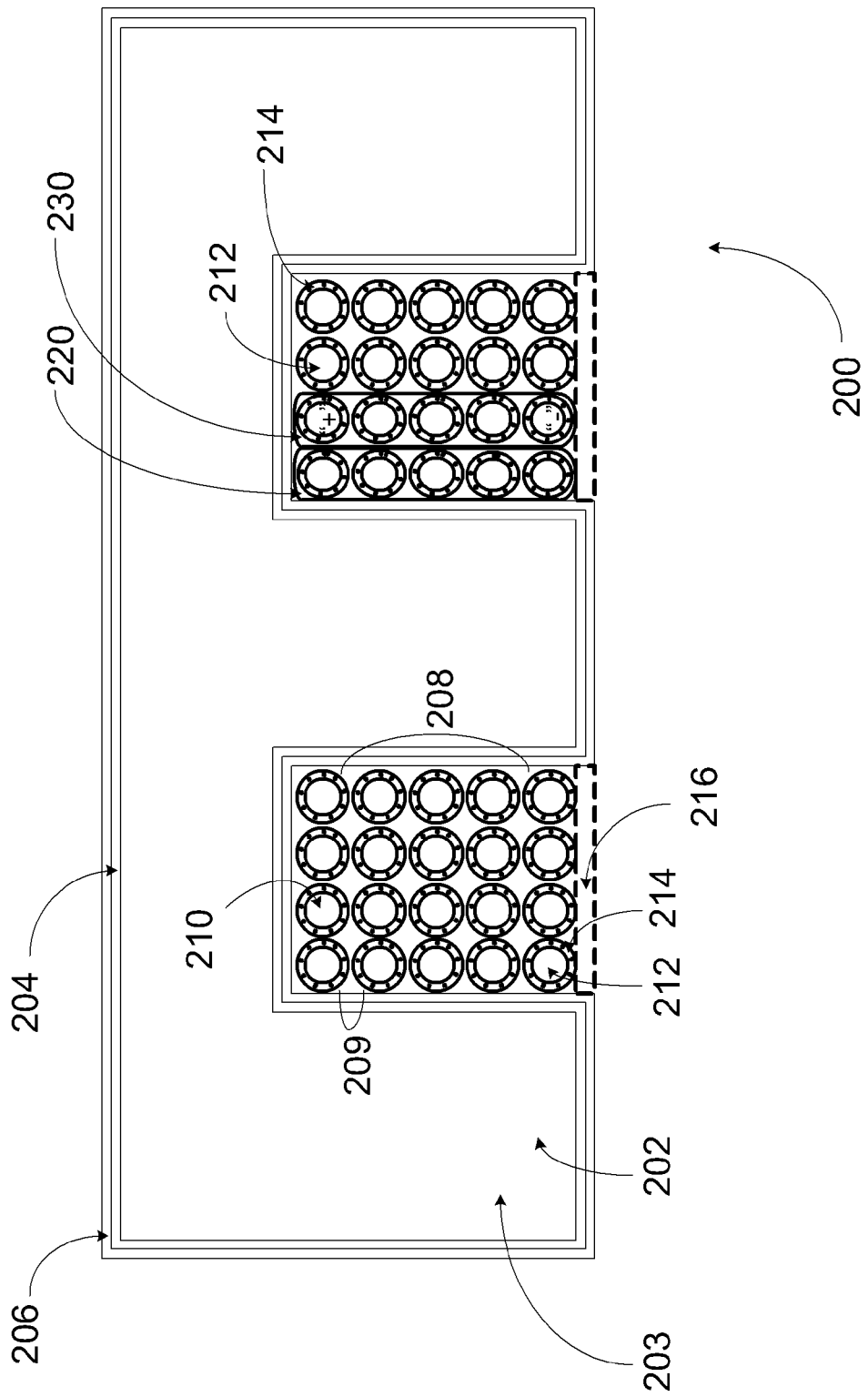
FIG. 2 is a cross sectional view of a dual insulated electrical coil assembly according to an embodiment of the invention.

Referring now to FIG. 2, a cross sectional view of a dual insulated electrical coil assembly according to an embodiment of the invention is shown. The exemplary dual insulated electrical coil assembly 200 is particularly suited for use in an electrical machine operated in a submarine environment, wherein the gap between the coil assembly 200 and magnetic elements in the machine, such as a magnetic rotor (not shown) for example, is flooded with water, and in particular flooded with seawater, which is electrically conductive and chemically aggressive, and is typically invasive, gradually permeating into many materials. The inventive coil assembly 200 is also suited for use in electrical machines that may be submerged in, or flooded with, other conductive and/or chemically aggressive media, such as in chemical or industrial applications, or in environments subjected to wetting or spray from conductive and/or chemically aggressive media such as coastal and offshore installations including offshore wind generation machines, for example.

The coil assembly 200 comprises magnetic core 202 and electrical winding 208, which is wound around at least a portion of the magnetic core 202. The inventive dual insulated coil assembly 200 desirably provides protection against electrical faults or shorts within the coil assembly that may be caused by ingress of water towards electrical winding 208 in electrical machines exposed to conductive and/or chemically aggressive environments. Such exposure may occur in electrical machines subjected to spray or wetting by seawater such as coastal wind turbines for example, or more particularly electrical machines subjected to prolonged continuous submarine operation immersed in, and/or flooded by seawater, such as submarine tidal power generators, for example.

The magnetic core 202 may comprise any suitable ferromagnetic material, and preferably comprises multiple parallel laminae 203 of electrical steel. Magnetic core 202 also comprises at least one dielectric insulation layer 204 substantially surrounding the magnetic core 202 to provide electrical insulation against shorts or faults within the coil assembly 200, such as between the magnetic core 202 and winding 208, for example. Dielectric insulation layer 204 preferably comprises an electrical resin layer, such as powder-coated electrical resin materials typically used on magnetic core elements designed for conventional dry applications. Magnetic core 202 further comprises at least one waterproof adhesive layer 206 substantially surrounding and preferably adhered to the dielectric insulation layer 204, to provide protection against the ingress of water towards the magnetic core 202. Waterproof adhesive layer 206 may preferably form an adhesive waterproof film which provides protection against water ingress by blocking bulk water flow through layer 206 by means of adhesive forces attaching layer 206 to dielectric insulation layer 204, and additionally by significantly reducing any slow diffusion or dispersion of water through waterproof adhesive layer 206 itself. Waterproof adhesive layer 206 may typically comprise a waterproof epoxy paint system suited for marine use, such as a self-priming waterproof epoxy marine paint system comprising multiple coats or layers of one or more suitable epoxy-based adhesive waterproofing materials, for example. In a particular embodiment, suitable materials for use as waterproof adhesive layer 206 may comprise a multicoat epoxy marine adhesive paint, and more particularly a two-component, high-build, polyamide adduct-cured epoxy marine adhesive paint, such as is sold commercially as Hempel™ 1763 formulation, by Hempel A S of Lyngby, Denmark.

Electrical winding 208 comprises one or more winding layers of flexible electrical cable 210, comprising a central flexible conductive core 212, which may typically comprise copper or another suitable flexible conductive material, and at least one dielectric insulation layer 214 substantially surrounding the conductive core 212 along the entire length of cable 210. The dielectric insulation layer 214 provides electrical insulation along the entire length of cable 210, to protect against electrical faults or shorts such as between magnetic core 202 and cable 210, or between turns of cable 210 in winding 208.

The dielectric insulation layer 214 preferably comprises a waterproof molecular barrier material, in order to provide protection against ingress of water through the dielectric insulation layer 214 into the cable 210, and into contact with conductor 212, which may result in fault or failure of winding 208 and consequently of coil assembly 200. Dielectric insulation layer 214 may comprise one or more suitable materials providing dielectric and preferably also waterproof molecular barrier properties, such as one or more of chlorosulfonated polyethylenes, cross-linked polyethylenes, and olefins, for example. Commercially available electrical cable comprising the above-recited properties may be applied according to the invention, such as electrical cable designed for frequent wet service, which may comprise a copper conductor surrounded by a Hypalon™ chlorosulfonated polyethylene dielectric insulation layer, for example.

In one embodiment, the electrical winding 208 may comprise multiple winding layers such as layers 220 and 230, for example. In such a case, each turn of a single winding layer 220 may be wound around magnetic core 202 in series, and the entire winding layer 220 may preferably be wound from a single continuous length of electrical cable 210, so as to provide a winding layer 220 free of connectors or other breaks in the dielectric insulation layer 214 surrounding the conductor 212. This is advantageous as such connectors or other breaks in the dielectric insulation layer 214 have been found to provide localized weakness to water ingress, and have been found to correspond to increased risk of electrical faults in wet service. Providing such connector-free winding layers 220, 230 according to the invention may advantageously reduce the risk of ingress of water or other contaminants into the winding cable within the winding layer 220, and thereby also reduce the risk of electrical faults in the winding cable 210.

In a preferred embodiment, each winding layer comprises a separate continuous length of electrical cable 210, and such individual lengths of electrical cable may be connected at their ends to connect multiple winding layers, such as layers 220 and 230, in parallel connection, thereby providing for fault tolerance if one length of cable 210 in a single winding layer 220 develops a fault or short, and allowing remaining separate winding layers such as layer 230 to continue operating substantially unaffected in an electrical machine. This ability for separate winding layers to operate substantially unaffected by a fault in another winding layer in an electrical coil 200 according to the invention may be known as gracefully degradative operation. Additionally, such a preferred winding configuration also provides the benefit of reducing the maximum electrical potential gradient between adjacent portions of winding 208 within the coil assembly 200, and therefore also reduces the maximum dielectric stress in dielectric insulation layer 214 of electrical cable 210. Due to the parallel connection of adjacent separate winding layers 220, 230, for example, there is substantially zero electrical potential difference between winding layers 220, 230, providing for reduced dielectric stress and risk of dielectric breakdown of layer 214, which could result in electrical faults between adjacent winding layers, particularly for electrical coil assemblies 200 which may be submerged in or exposed to electrically conductive and/or chemically aggressive media, such as seawater. Further, the electrical potential difference between adjacent turns of cable 210 within a single winding layer, such as between adjacent turns 209, may be substantially constant throughout the multiple turns of the winding layer, thereby reducing potential concentrations of electrical potential difference between adjacent points in winding 208.

In particular preferred embodiments of the invention where multiple electrical coil assemblies 200 are connected in an electrical machine, such as in a stator of an electrical generator or motor for example, two or more electrical coil assemblies 200 each having two or more winding layers 220, 230, may be connected to form a phase of the electrical machine, wherein first winding layers 220 of each of the coil assemblies 200 in the phase are connected in series, and are preferably wound sequentially around the magnetic cores 202 of each coil assembly 200 using a single continuous length of electrical cable 210 free of electrical connectors within the cable length between coil assemblies 200. Similarly, the second winding layers 230 of each of the coil assemblies 200 in the phase are connected in series, and are preferably wound sequentially around the magnetic cores 202 of each assembly 200 in the series using a second continuous length of electrical cable 210 free of electrical connectors within the cable length. Such a configuration advantageously provides for an electrical machine with multiple coil assemblies 200 forming a phase, wherein each phase comprises multiple individual winding layers 220, 230 in each of the coils 200 of the phase, and where each winding layer comprises a single continuous and connector-free length of electrical cable 210, thereby reducing the risk of water ingress and faults associated with electrical connectors.

The electrical winding 208 additionally and optimally comprises at least one waterproof adhesive layer 216 applied on top of electrical cable 210, preferably substantially surrounding and adhered to the exterior of electrical cable 210, and more preferably adhered to the dielectric insulation layer 214 of the electrical cable 210 in winding 208, to provide protection against the ingress of water towards the dielectric insulation layer 214. Waterproof adhesive layer 216 thereby desirably provides protection against the exposure of dielectric layer 214 to water which may contribute to breakdown and eventual failure of the dielectric material. Such failure of the dielectric insulation layer 214 would typically result in the ingress of water toward conductor 212, which may cause a fault and/or failure of the electrical winding 208 or a winding layer 220, for example. Waterproof adhesive layer 216 may preferably form an adhesive waterproof film which provides protection against water ingress by blocking bulk water flow through layer 216 by means of adhesive forces attaching layer 216 to dielectric insulation layer 214, and additionally by significantly reducing any slow diffusion or dispersion of water through waterproof adhesive layer 216 itself. Waterproof adhesive layer 216 may typically comprise an adhesive waterproof epoxy paint system suited for marine use, such as a self-priming waterproof epoxy marine paint system comprising multiple coats or layers of one or more suitable epoxy-based adhesive waterproofing materials, for example. Suitable materials for use in waterproof adhesive layer 216 may preferably be selected taking into account mechanical and chemical compatibility of the waterproof adhesive layer 216 with dielectric insulating layer 214 to which it is adhered, thereby advantageously reducing the risk of cracking, tension or undesirable chemical reaction between dielectric insulation layer 214 and waterproof adhesive layer 216 which could lead to risks of water ingress and resultant electrical faults. Waterproof adhesive layer 216 may also comprise at least one layer of anti-fouling or fouling release paint such as self-priming waterproof anti-fouling or fouling release marine paint, for example, to advantageously provide protection against adhesion and fouling of the waterproof adhesive layer 216 with biological contaminants in submerged marine and/or freshwater environments, which could eventually result in the degradation or failure of the waterproof adhesive layer 216. In a particular embodiment, suitable materials for use as waterproof adhesive layer 216 may comprise a multi-coat polyamide epoxy marine adhesive paint, and more particularly a two-component, high-build, polyamide adduct-cured epoxy marine adhesive paint, such as is sold commercially as Hempel™ 1763 formulation, by Hempel A S of Lyngby, Denmark.

Figure 3:
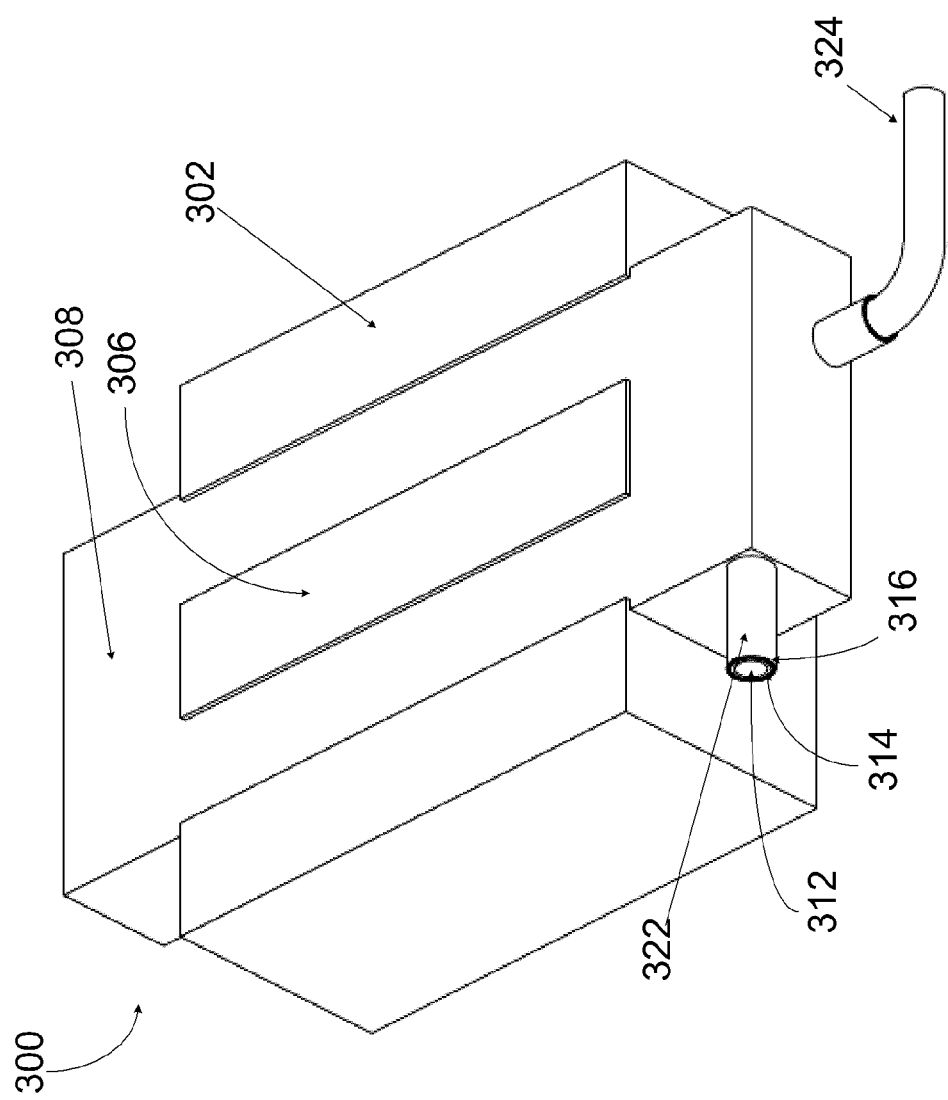
FIG. 3 is a perspective view of a dual insulated electrical coil assembly according to an embodiment of the invention.

Referring now to FIG. 3, a perspective view of a dual insulated electrical coil assembly according to an embodiment of the invention is shown. The dual insulated electrical coil assembly 300 comprises magnetic core 302 and electrical winding 308, wound around at least a portion of the magnetic core 302. Magnetic core 302 also comprises at least one dielectric insulation layer around the core, and at least one waterproof adhesive layer substantially surrounding and preferably adhered to the dielectric insulation layer (not shown). In the exemplary embodiment shown in FIG. 3, the electrical winding 308 is shown wound around a central portion 306 of magnetic core 302, and comprising a first input end 322 and second output end 324 of winding 308. Similar to as described above in reference to FIG. 2, electrical winding 308 may comprise one or more winding layers of electrical cable, which comprises inner conductor 312 and at least one dielectric insulation layer 314 comprising a waterproof molecular barrier material surrounding conductor 312, providing protection against water ingress towards dielectric insulation 314, and ultimately to conductor 312, to protect against electrical faults and/or failure of the winding 308. Additionally as described above in reference to FIG. 2, winding 308 comprises at least one waterproof adhesive layer 316 applied on top of and preferably substantially surrounding and adhered to the dielectric insulation layer 314. Similarly, magnetic core 302 also comprises at least one dielectric insulation layer substantially surrounding the magnetic core (not shown), and further comprises at least one waterproof adhesive layer surrounding and preferably adhered to the dielectric insulation layer, providing protection against ingress of water towards magnetic core 302.

In a particular embodiment, at least a portion of winding 308 may be encapsulated in an insulating encapsulation material, to form a substantially sealed capsule. For example, the ends of winding 308 which protrude beyond the edge of magnetic core 302 at either end of the coil assembly 300 may be encapsulated in a suitable insulative material such as a cured resin insulating material. In one embodiment, such resin insulating material may be applied in a liquid or gel state to the ends of winding 308, and may be cured to encapsulate the ends of winding 308 inside the resin as it solidifies. In such an embodiment, waterproof adhesive layer 316 may be applied to winding 308 before and/or after such encapsulation, to provide at least one waterproof adhesive layer 316 adhered to the winding 308 to provide protection against the ingress of water into winding 308. In a preferred embodiment, a cured polyurethane-based resin may be used to encapsulate at least a portion of winding 308, for example.

Figure 4:
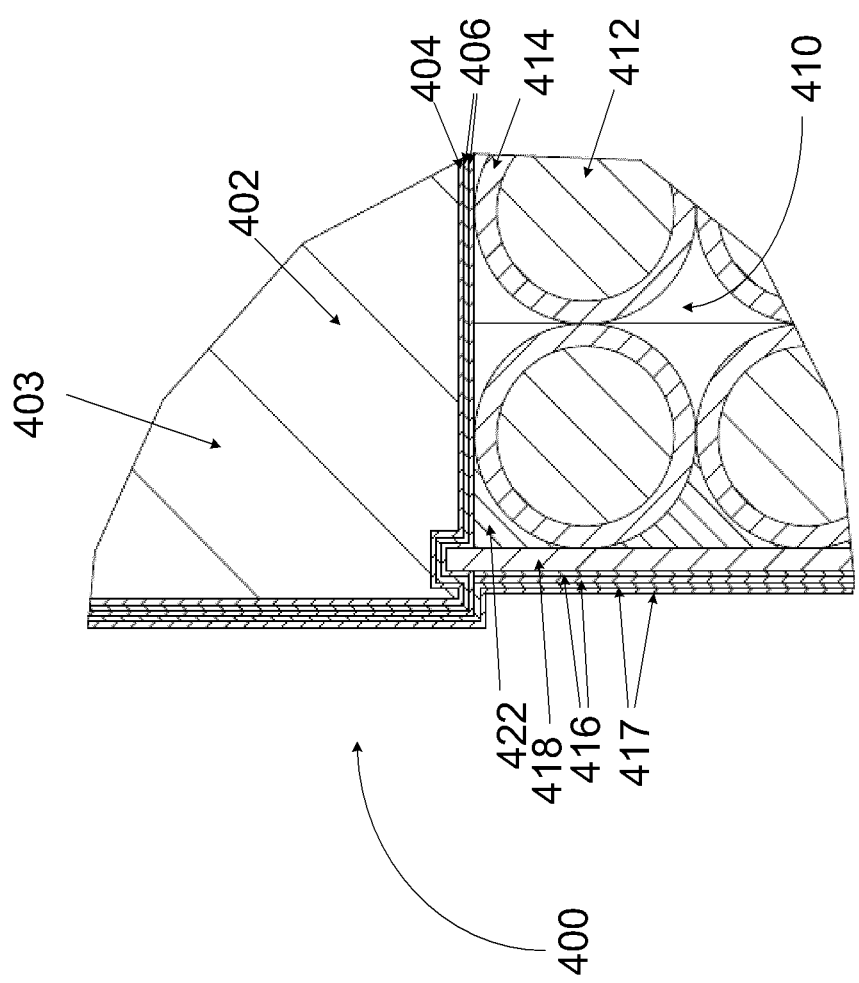
FIG. 4 is a detail cross sectional view of a portion of a dual insulated electrical coil assembly according to an embodiment of the invention.

Referring now to FIG. 4, a detailed cross sectional view of a portion of a dual insulated electrical coil assembly 400 according to an embodiment of the invention is shown, wherein the cross section is taken perpendicularly across the winding and magnetic core of a coil assembly 400, substantially similar to as described above in FIGS. 2 and 3. According to an exemplary embodiment suitable for submerged use in a marine environment, the dual insulated electrical coil assembly 400 comprises magnetic core 402 and an electrical winding comprising multiple turns of electrical cable 410 wound around at least a portion of magnetic core 402. Magnetic core 402 comprises multiple substantially parallel electrical steel laminae 403, however, in other embodiments, other suitable ferromagnetic material may be used to form magnetic core 402. Magnetic core 402 is surrounded by dielectric insulation layer 404 comprising dry-service electrical epoxy resin insulation, or other suitable dielectric insulation material. Magnetic core 402 further comprises at least one waterproof adhesive layer 406 substantially surrounding and preferably adhered to the dielectric insulation layer 404, to provide protection against the ingress of water towards the magnetic core 402. Preferably, waterproof adhesive layer 406 comprises a self-priming epoxy paint.

The electrical winding comprises multiple turns of electrical cable 410 which is wound around at least a portion of magnetic core 402. Electrical cable 410 comprises a flexible center conductor 412, preferably of copper, which is surrounded by a dielectric insulation layer 414 comprising a polyethylene waterproof molecular barrier material, such as a chlorosulfonated polyethylene which is commercially available as a wet or submerged service cable and commonly known as Hypalon™ shielded copper cable, for example. Such electrical cable 410 including dielectric insulation layer 414 thereby provides electrical insulative protection and waterproof protection to the conductor 412. In one embodiment, at least a portion of the electrical cable 410 in the electrical winding may be encapsulated in an insulating encapsulation material 422, such as polyurethane resin, for example. Additionally, in another embodiment, electrical cable 410 in the electrical winding may be secured to or retained within the magnetic core 402 by a dielectric plate 418 comprising a suitable substantially rigid dielectric material, such as fiberglass for example.

At least one waterproof adhesive layer 416 is applied on top of electrical cable 410 in the electrical winding of coil assembly 400 to provide protection against water ingress towards cable 410 and particular conductor 412, and such waterproof adhesive layer is preferably also applied on top of and substantially surrounding magnetic core 402 as shown in FIG. 4. In a preferred embodiment, the waterproof adhesive layer 416 comprises a self-priming epoxy paint, such as is commercially available for marine applications. In another embodiment, the electrical coil assembly 400 additionally comprises at least one layer of anti-fouling or fouling release paint 417, such as is also commercially available for submerged marine applications.

Figure 5:
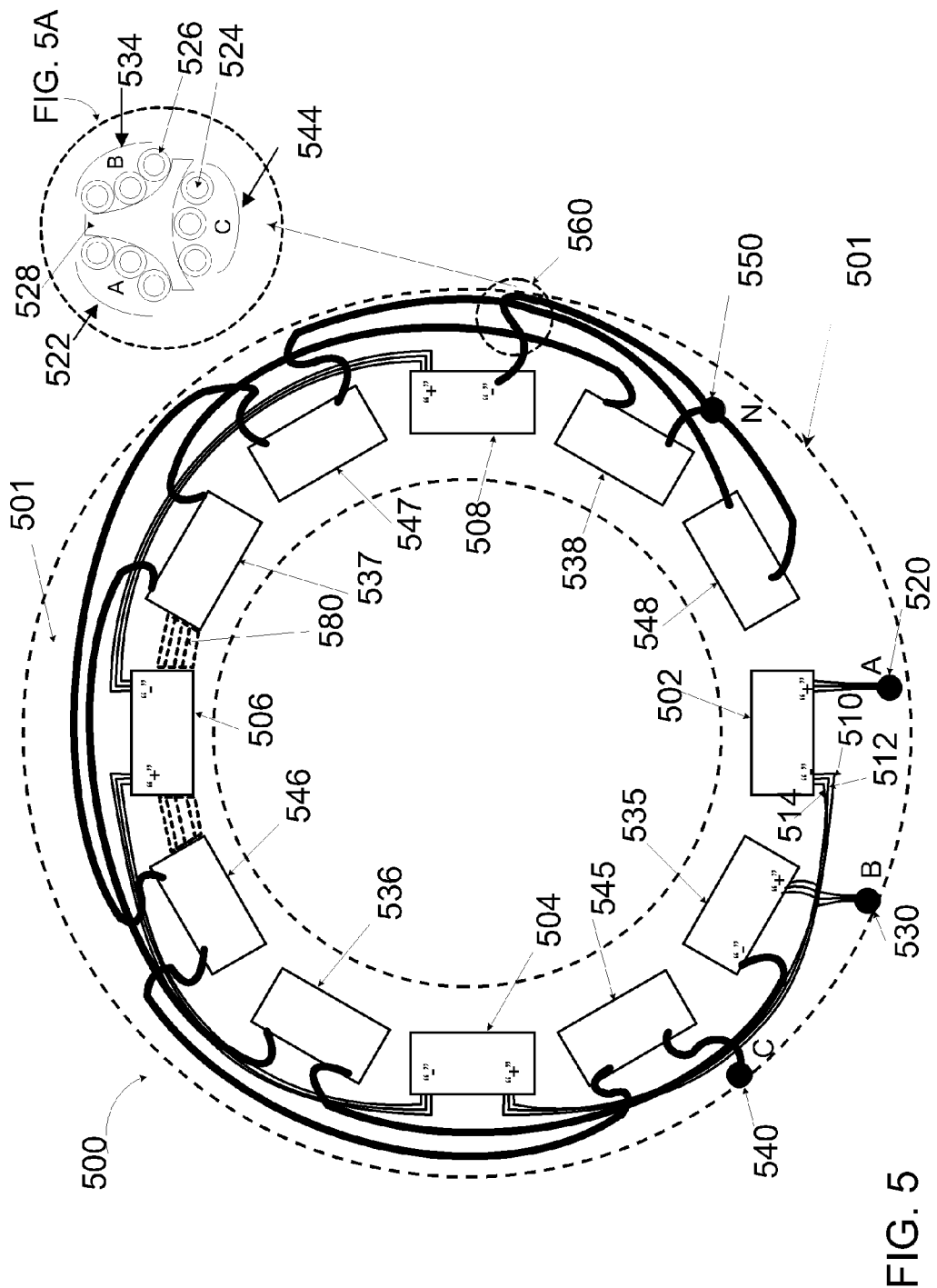
FIG. 5 is a schematic representation of an electrical machine comprising multiple dual insulated electrical coil assemblies according to an embodiment of the invention.

Referring to FIG. 5, a schematic representation of an electrical machine 500 comprising multiple dual insulated electrical coil assemblies according to an embodiment of the invention is shown. Electrical machine 500 comprises at least one stator assembly 501 comprising multiple dual insulated electrical coil assemblies 502, such as described above in reference to FIGS. 2-4. The electrical machine 500 according to the present invention may comprise an electrical generator and/or motor, for example, and is particularly suited for use in electrically conductive and/or chemically aggressive environments, such as prolonged exposure to or submersion in seawater, which may lead to increased risk of electrical fault or failure in the electrical machines of the prior art which incorporate conventional coil assemblies. In a particular embodiment, electrical machine 500 may comprise two parallel stators located on either side of a magnetic rotor (not shown), which rotates relative to both stators. Alternatively, in another exemplary embodiment, electrical machine 500 may have a single stator, which may be single or double sided to operate in cooperation with one or two magnetic rotors (not shown) for example. The exemplary stator 501 of electrical machine 500 is divided into three electrical phases represented by phase connections 520, 530 and 540, as well as a common neutral phase connection 550. In other embodiments, a greater or lesser number of electrical phases may be applied, such as typically 2-6 phases, for example.

Each electrical phase of stator 501 comprises four exemplary dual insulated coil assemblies, such as those illustrated in FIGS. 2-4, for example, which are electrically interconnected. In alternative embodiments each phase may comprise more or fewer coil assemblies, such as may depend upon the desired size or power rating of the electrical machine, for example. The first phase 520 comprises interconnected dual insulated coil assemblies 502, 504, 506, and 508, which are spaced substantially equidistant from each other around the circumference of annular stator 501, such as to substantially align the coil assemblies with a magnetic rotor element (not shown) which moves relative to the stator 501 in electrical machine 500. Similarly, second phase 530 comprises interconnected coil assemblies 535, 536, 537, and 538, and third phase 540 comprises interconnected coil assemblies 545, 546, 547 and 548. The coil assemblies within each phase are substantially equidistantly spaced, and coil assemblies of each of the three phases alternate with the coil assemblies of the other phases proceeding around the circumference of stator 501 as shown. Coil assemblies 520 may be attached to stator 501 by any suitable means, such as by common mechanical methods such as bolts, or other fasteners, for example.

In one embodiment, each dual insulated coil assembly may comprise multiple winding layers, wherein each winding layer comprises a single continuous length of electrical cable, similar to as described above in reference to FIG. 2. In the exemplary embodiment shown in FIG. 5, each dual insulated coil assembly 502, 504, 506 and 508 in electrical phase 520 comprises three winding layers, and each winding layer comprises a single continuous length of electrical cable, such as individual cable lengths 510, 512 and 514. Additionally, each of the three winding layers in each coil assembly 502, 504, 506, and 508 in phase 520 are wound in series from separate continuous length of cable. Therefore the first winding layer in each of coil assemblies 502, 504, 506 and 508 in phase 520 are wound in series from continuous cable length 510. Similarly, the second winding layer of each of coil assemblies 502, 504, 506 and 508 are wound in series from continuous cable length 512, and the third winding layer of each of coil assemblies 502, 504, 506 and 508 are wound in series from continuous cable length 514. Individual cable lengths 510, 512 and 514 which form first, second and third winding layers in each of coil assemblies 502, 504, 506 and 508 are connected in parallel at phase connection 520 and neutral phase connection 550 to form a first electrical phase 520 of stator 501. Similarly, the electrical coil assemblies forming second phase 530 and third phase 540 also comprise three winding layers, each wound in series from a separate continuous cable length, and the three individual cable lengths are connected in parallel at phase connections 530 and 540, respectively, and also at neutral phase connection 550 to form second and third electrical phases 530 and 540 of stator 501. This winding configuration of the electrical phases of stator 501 desirably provides for fault-tolerant multi-coil electrical phases with multiple separately wound winding layers in each electrical coil assembly, such that if an electrical fault occurs in one winding layer in a phase, the remaining winding layers may continue to operate substantially unaffected, as they are wound with a separate length of electrical cable, which is independently insulated from the faulted winding layer by the dielectric insulation layer surrounding the cable. Additionally, this winding configuration also desirably provides for reduced risk of electrical faults within a winding layer of a phase and particularly between coil assemblies in a phase because each winding layer of the phase is wound from a continuous cable length without connectors or other potentially vulnerable breaks in the dielectric insulation layer of the cable, which may be associated with increased risk of water ingress and associated electrical faults. Indeed, the only connectors or other breaks in the dielectric insulation layer of the electrical cables forming the winding layers in a phase are at the ends of the electrical cables where they are connected in parallel at phase connection 520 and neutral connection 550.

In one embodiment, each dual insulated electrical coil assembly 502 of the stator 501 may be physically spaced apart from other coil assemblies on stator 501, with a gap between each coil assembly. In such an embodiment, each coil assembly 502 may therefore be substantially physically, magnetically and thermally decoupled from all other coils assemblies in the stator 501, as the magnetic cores of each coil assembly are not in direct contact or immediate proximity to each other, and faults in one coil assembly 502 do not substantially magnetically or thermally influence adjacent coil assemblies 535 and 548. In such an embodiment, the substantial magnetic and thermal decoupling of dual insulated electrical coil assemblies in stator 501 may desirably provide fault tolerant operation of the electrical machine 500, as a fault in one electrical coil assembly does not substantially influence or affect the operation of adjacent coil assemblies.

In an optional alternative embodiment, where it is desired to increase the total magnetic flux generated in the stator 501, or to reduce discontinuities in the magnetic flux generated around the stator 501 (such as to reduce vibrations or cogging of a rotating magnetic rotor moving relative to stator 501 in an electrical machine), optional magnetic connectors 580 may be installed in the gaps between dual insulated electrical coil assemblies to partially or completely fill the spatial gaps between coil assemblies, thereby increasing the total magnetic flux and/or increasing the continuity of magnetic flux induced in the stator 501 during operation of the electrical machine 500. In a case where optional magnetic connectors 580 are installed such that the gaps between coil assemblies are only partially connected, adjacent coil assemblies may desirably remain at least partially magnetically and thermally decoupled, to reduce the influence of one coil assembly 506 on the magnetic and/or thermal operation of adjacent coil assemblies 546 and 537, for example. Additionally, optional magnetic connectors 580 may be mechanically connected to the magnetic cores of adjacent dual insulated electrical coil assemblies 506 and 537, or alternatively, may be connected to stator 501 such that gaps remain between magnetic connector 580 and coil assemblies 506 and 537. Optional magnetic connectors 580 may comprise any suitable ferromagnetic material, such as conventional electrical steel, for example.

Referring to FIG. 5A, a cross sectional view of a multiphase power conduit 560 in the electrical machine of FIG. 5 according to an embodiment of the invention is shown. Multiphase power conduit 560 comprises sets of electrical cables 522, 534 and 544, which correspond to electrical phases 520, 530 and 540, respectively. Each electrical cable in power conduit 560 comprises a central conductor 524, such as copper, and a dielectric insulation layer 526 surrounding the conductor, as described above in reference to FIGS. 2-5. Electrical cable set 522 comprises electrical cables 510, 512, and 514, corresponding to first, second and third winding layers in the electrical coil assemblies of phase 520. Similarly, electrical cable sets 534 and 544 comprise electrical cables corresponding to the three winding layers in the coil assemblies of electrical phases 530 and 540, respectively. Electrical cable sets 522, 534 and 544 are physically separated in multiphase power conduit 560 by insulating cable separator 528 to prevent physical contact and provide additional insulation between electrical cables of different phases.

In a preferred embodiment, electrical cables from different phases are desirably kept physically separated at all points of electrical machine 500, such as within multiphase power conduits, between coil assemblies, and at overlaps of electrical cables from different phases. Further insulating cable separators similar to separator 528 may be used to ensure physical separation and insulation between electrical cables from different phases in stator 501. Such physical separation desirably provides for substantial physical decoupling of the electrical phases 520, 530 and 540 within electrical machine 500, and between electrical coil assemblies belonging to different phases, and provides for reduced risk of electrical faults between phases, and reduced risk of a fault occurring in an electrical cable of one phase or electrical coil assembly from affecting the operation of another phase or electrical coil assembly. Such substantial physical decoupling of phases and coil assemblies desirably contributes to providing fault tolerant operation of electrical machine 500 according to the invention.

Figure 6:
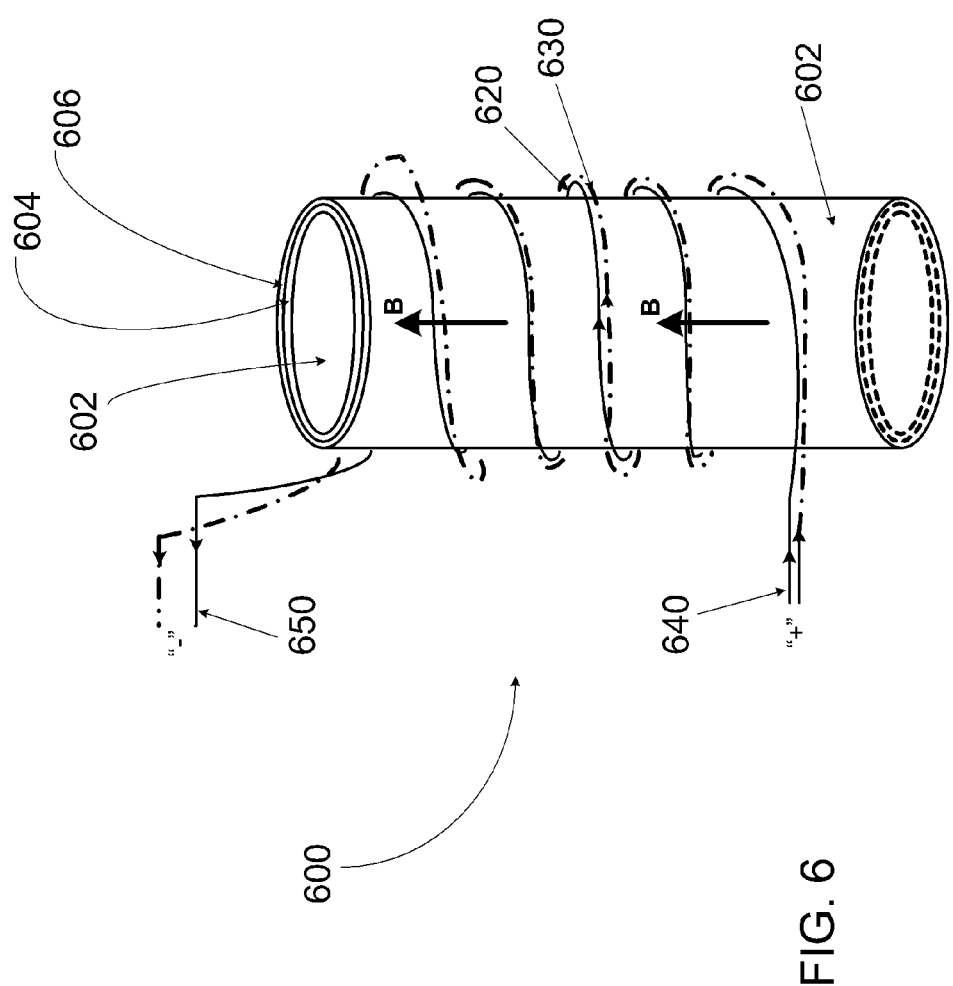
FIG. 6 is a schematic representation of a first winding configuration for an electrical coil assembly according to an embodiment of the invention.

Referring to FIG. 6, a schematic representation of a first winding configuration for an electrical coil assembly 600 according to an embodiment of the invention is shown. According to one embodiment, the exemplary winding configuration shown in schematic form in coil assembly 600 may be applied in the dual insulated electrical coil assembly 200 as described above in reference to FIG. 2. The exemplary dual insulated electrical coil assembly 600 and associated winding configuration shown in FIG. 6 comprises first winding layer 620 and second winding layer 630 wound around at least a portion of magnetic core 602. As described above in reference to FIGS. 2-5, other embodiments may comprise different numbers of winding layers, such as typically between about 2-10 winding layers, for example. Magnetic core 602 also comprises at least one dielectric insulation layer 604 substantially surrounding magnetic core 602, and at least one waterproof adhesive layer 606 substantially surrounding dielectric insulation layer 604, as described above in reference to FIGS. 2-5. Further, first and second winding layers 620 and 630 preferably comprise flexible electrical cable comprising at least one dielectric insulation layer surrounding a conductor, and at least one waterproof adhesive layer, as described in greater detail above in reference to FIGS. 2-5.

In the exemplary dual insulated electrical coil assembly 600, first winding layer 620 and second winding layer 630 are wound between a phase connection end 640 of the winding layer which is closer to the phase connection of the electrical phase circuit, such as phase connection 520 of electrical machine 500, and a neutral connection end 650 of the winding which is closer to the neutral connection of the electrical phase circuit, such as neutral connection 550 of electrical machine 500. The second winding layer 630 is wound substantially adjacent to and in the same configuration as the first winding layer 620, resulting in multiple substantially parallel oriented winding layers around magnetic core 602. In such parallel oriented winding layers, the electrical potential difference between adjacent winding layers is substantially zero, which provides for minimized dielectric stress between adjacent electrical cables in each winding layer, and desirably reduces the risk of electrical fault between winding layers. Additionally, the electrical potential difference between adjacent turns of electrical cable in one winding layer 620 are substantially constant along the length of the coil assembly 600, and across each coil assembly connected together in a phase in an electrical machine such as electrical machine 500, thus providing for a substantially uniform dielectric stress between adjacent turns in a winding layer 620, and desirably reducing dielectrically overstressed zones which may result in faults.

Figure 7:
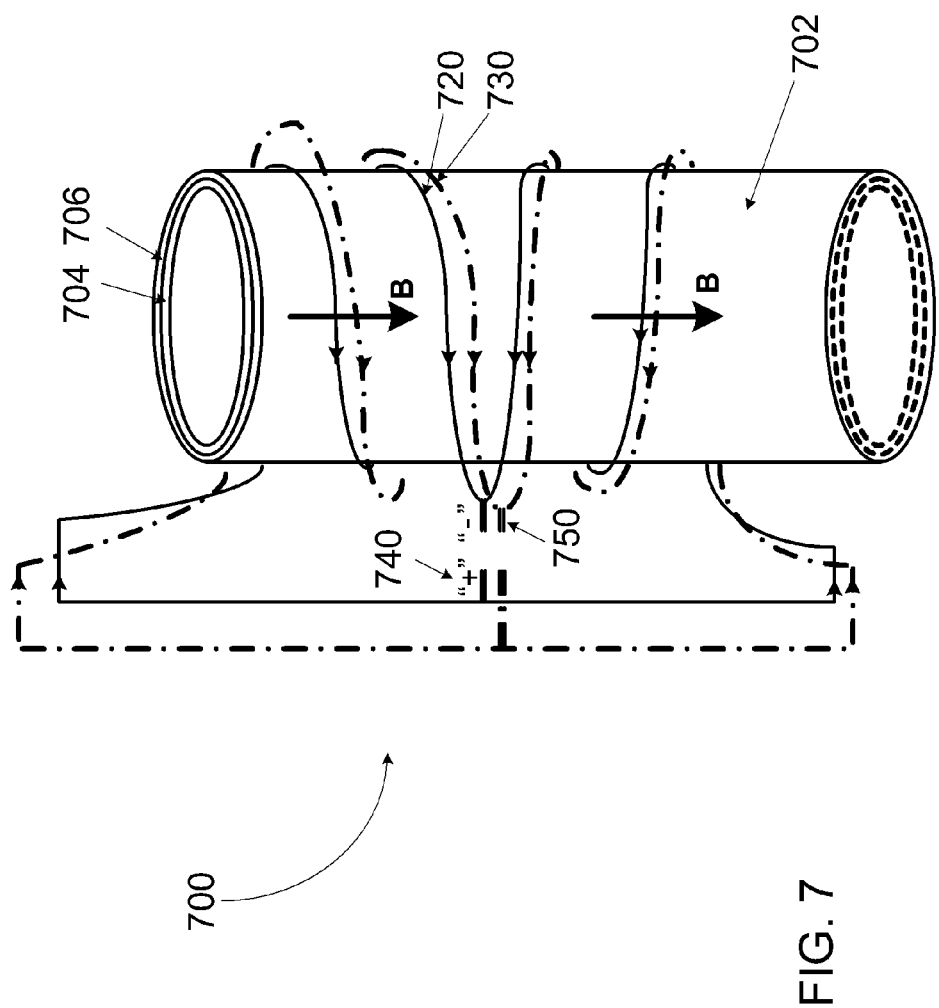
FIG. 7 is a schematic representation of a second winding configuration for an electrical coil assembly according to an embodiment of the invention.

Referring to FIG. 7, a schematic representation of a second winding configuration for an electrical coil assembly 700 according to an embodiment of the invention is shown. The exemplary dual insulated electrical coil assembly 700 and associated winding configuration shown in FIG. 7 comprises first winding layer 720 and second winding layer 730 wound around at least a portion of magnetic core 702. As described above in reference to FIG. 6, other embodiments may comprise different numbers of winding layers, such as typically between about 2-10 winding layers, for example. Magnetic core 702 also comprises at least one dielectric insulation layer 704 substantially surrounding magnetic core 702, and at least one waterproof adhesive layer 706 substantially surrounding dielectric insulation layer 704, as described above in reference to FIGS. 2-5. Further, similar to coil assembly 600 described above, first and second winding layers 720 and 730 preferably comprise flexible electrical cable comprising at least one dielectric insulation layer surrounding a conductor, and at least one waterproof adhesive layer applied on top of and preferably surrounding and adhered to the electrical cable.

In the exemplary dual insulated electrical coil assembly 700, first winding layer 720 and second winding layer 730 are wound between two phase connection ends 740 of the winding layer, and a central neutral connection end 750 of the winding layer. The two phase connection ends 740 of the winding layer are located at either end of the magnetic core 702 and are closer to the phase connection of the electrical phase circuit, such as phase connection 520 of electrical machine 500. Conversely, the central neutral connection end 750 of the winding layer is located in substantially the center of the magnetic core 702, and is closer to the neutral connection of the electrical phase circuit, such as neutral connection 550 of electrical machine 500. The second winding layer 730 is wound substantially adjacent to and in the same configuration as the first winding layer 720, resulting in multiple substantially parallel oriented winding layers around magnetic core 702. Similarly to coil assembly 600 above, adjacent parallel oriented winding layers such as layers 720 and 730, have substantially zero electrical potential difference between them, which provides for minimized dielectric stress between adjacent electrical cables in each winding layer, and desirably reduces the risk of electrical fault between winding layers. Additionally, in coil assembly 700, the maximum potential difference and therefore maximum dielectric stress between the winding layer 720 and the magnetic core 702 is located at the outer phase connection ends 740 of the winding layer 720, while the inner portion of the winding layer 720 near the center of magnetic core 702 is less dielectrically stressed. Such a winding configuration with the relative dielectric stress, and therefore also the risk of dielectric failure and electrical fault reduced at the center of the winding layer 720 and magnetic core 702 may be desirable for some configurations of electrical machines, such as where the center of the winding layer may be particularly critical to the operation of the machine, or particularly difficult to access or repair, for example.

Figure 8:
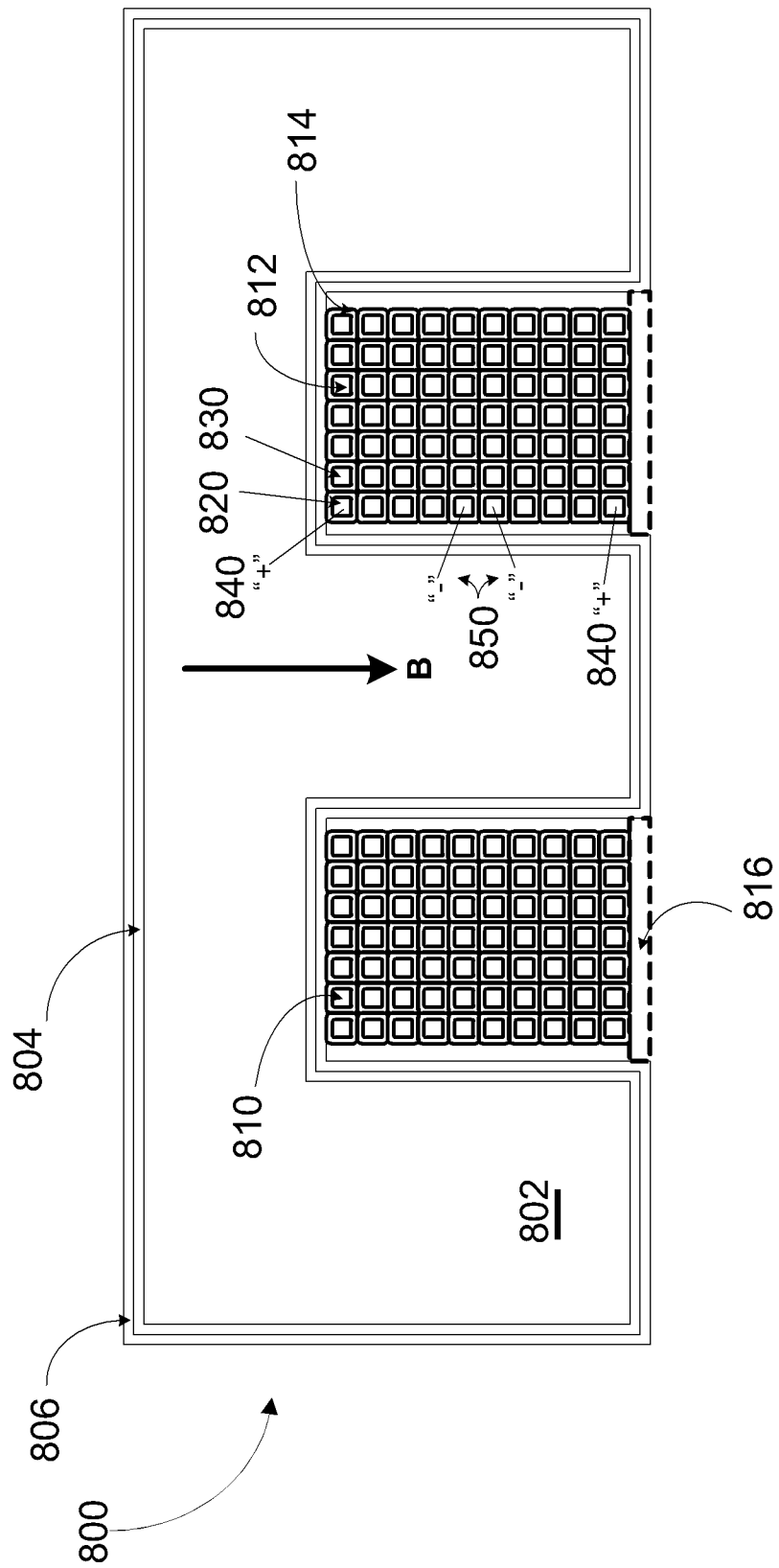
FIG. 8 is a cross sectional view of a dual insulated electrical coil assembly incorporating the second winding configuration illustrated in FIG. 7, according to an embodiment of the invention.

Referring to FIG. 8, a cross sectional view of a dual insulated electrical coil assembly 800 incorporating the second winding configuration illustrated in FIG. 7, according to an embodiment of the invention is shown. Coil assembly 800 is similar to the dual insulated electrical coil assembly 200 as described above in reference to FIG. 2, and comprises magnetic core 802 and an electrical winding comprising at least two substantially parallel oriented electrical winding layers 820 and 830, which are wound around at least a portion of the magnetic core 802. The magnetic core 802 may comprise any suitable ferromagnetic material, preferably comprising laminated electrical steel, and also comprises at least one dielectric insulation layer 804 substantially surrounding the magnetic core 802 to provide electrical insulation against shorts or faults within the coil assembly 800, such as between the magnetic core 802 and a winding layer 820, for example. Magnetic core 802 further comprises at least one waterproof adhesive layer 806 substantially surrounding and preferably adhered to the dielectric insulation layer 804, to provide protection against the ingress of water towards the magnetic core 802.

Electrical winding layers 820, 830 preferably comprise flexible electrical cable 810, comprising a central flexible conductive core 812, which may typically comprise copper or another suitable flexible conductive material, and at least one dielectric insulation layer 814 surrounding the conductive core 812 along the entire length of cable 810. The dielectric insulation layer 814 provides electrical insulation along the entire length of cable 810, to protect against electrical faults or shorts such as between magnetic core 802 and cable 810, or between turns of cable 810 in the winding of coil assembly 800. The dielectric insulation layer 814 also preferably comprises a waterproof molecular barrier material, in order to provide protection against ingress of water through the dielectric insulation layer 814 into the cable 810, which may result in electrical fault or failure. Similar to as in coil assembly 200 described above, dielectric insulation layer 814 may comprise one or more suitable materials providing dielectric and preferably also waterproof molecular barrier properties, such as one or more of chlorosulfonated polyethylenes, crosslinked polyethylenes, and olefins, for example. The electrical winding layers 820, 830 additionally comprises at least one waterproof adhesive layer 816 applied on top of electrical cable 810, preferably surrounding and adhered to the exterior of electrical cable 810, and more preferably adhered to the dielectric insulation layer 814 of the electrical cable 810, to provide protection against the ingress of water towards the dielectric insulation layer 814, similar to as described above in coil assembly 200. Waterproof adhesive layer 816 may typically comprise an adhesive waterproof epoxy paint system suited for marine use, such as a self-priming waterproof epoxy marine paint system comprising multiple coats or layers of one or more suitable epoxy-based adhesive waterproofing materials, for example.

Similar to as shown in schematic coil assembly 700 in FIG. 7, the electrical winding layers 820, 830 in coil assembly 800 are wound between two phase connection ends 840 of the winding layer, and two central neutral connection ends 850 of the winding layer. The two phase connection ends 840 of each winding layer are located at either end of the wound portion of magnetic core 802 and are closer to the phase connection of the electrical phase circuit, such as phase connection 520 of electrical machine 500. Conversely, the central neutral connection ends 850 of each winding layer are located in substantially the center of the wound portion of magnetic core 802, and are closer to the neutral connection of the electrical phase circuit, such as neutral connection 550 of electrical machine 500. The second winding layer 830 is wound substantially adjacent to and in the same configuration as the first winding layer 820, resulting in multiple substantially parallel oriented winding layers around magnetic core 802. In one embodiment, each winding layer 820 may preferably be wound from a single continuous length of electrical cable 810, so as to provide a winding layer 820 free of connectors or other breaks in the dielectric insulation layer 814 surrounding the conductor 812, desirably reducing the risk of electrical faults within winding layer 820.

In an alternative embodiment directed to applications of the present invention where the dual insulated electrical coil assembly 800 and associated components is not immersed or flooded with water or other conductive and/or chemically aggressive media or wherein maximum protection of the electrical coil assembly 800 is not required, it may be desirable to decrease the thickness of dielectric insulation layer 814 surrounding electrical conductor 812 of electrical cable 810, such that the proportion of the electrical winding occupied by conductor 812 is increased, thus increasing the potential efficiency and power factor provided by the coil assembly 800. Exemplary such less extreme applications may include applications in electrical machines such as electrical generators and/or motors or electrical inductors for use near the ocean, such as on offshore platforms, offshore wind turbines, or in coastal areas, where the electrical coil assembly is not immersed in or flooded with water. In a further alternative embodiment directed to applications in less extreme environments, magnetic wire 810 may be used in place of electrical cable, wherein the magnetic wire 810 comprises conductor 812 (typically copper) and conventional dielectric insulation layer 814, such as a resin dielectric material, for example, to desirably increase the proportion of the electrical winding occupied by conductor 812 and increase the potential efficiency and power factor provided by the coil assembly 800. In some such applications, magnetic wire 810 may be either substantially round in cross section, or substantially square in cross section.

Figure 9:
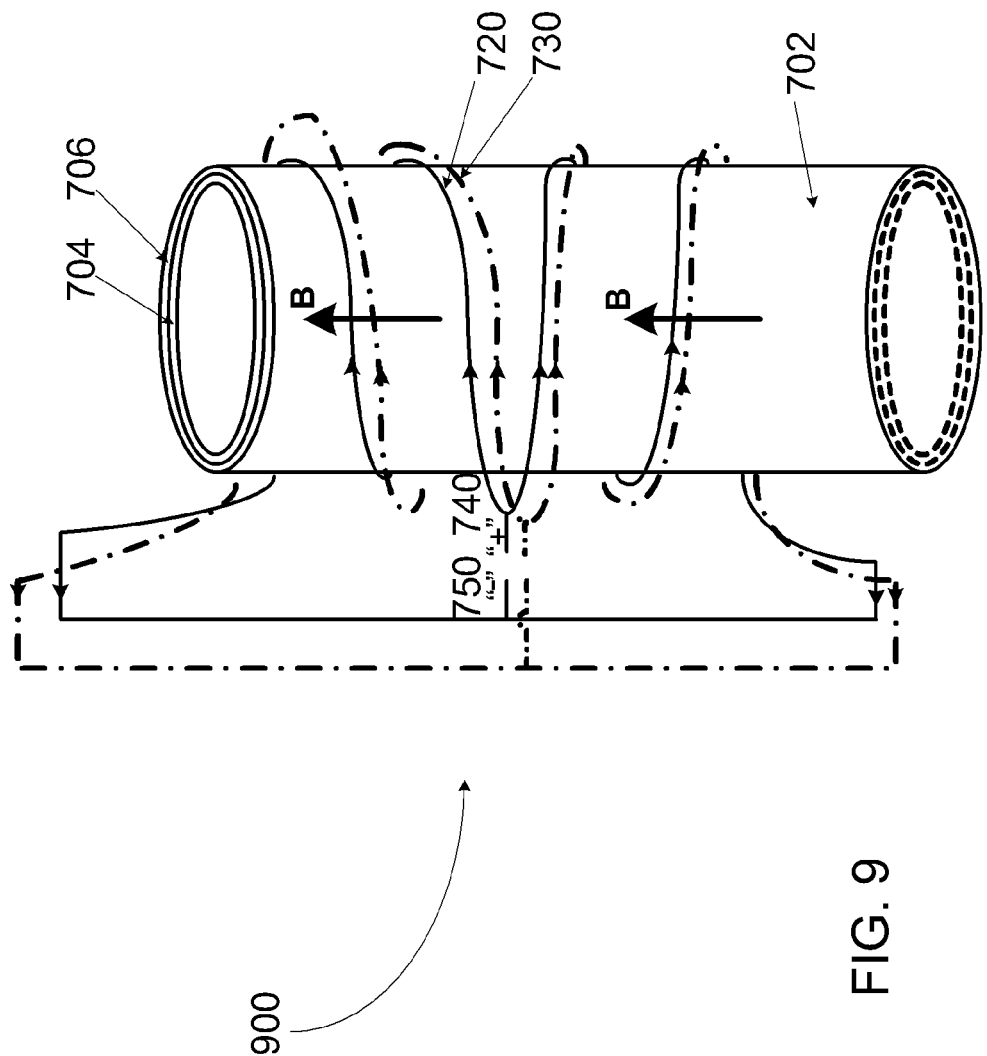
FIG. 9 is a schematic representation of a third winding configuration for an electrical coil assembly according to an embodiment of the invention.

Referring to FIG. 9, a schematic representation of a third winding configuration for an electrical coil assembly 900 according to an embodiment of the invention is shown. The exemplary dual insulated electrical coil assembly 900 and associated winding configuration shown in FIG. 9 is substantially similar to coil assembly 700 described above in reference to FIG. 7, and comprises first winding layer 720 and second winding layer 730 wound around at least a portion of magnetic core 702. Magnetic core 702 also comprises at least one dielectric insulation layer 704 substantially surrounding magnetic core 702, and at least one waterproof adhesive layer 706 substantially surrounding dielectric insulation layer 704, as described above. Further, similar to coil assembly 700 described above, first and second winding layers 720 and 730 preferably comprise flexible electrical cable comprising at least one dielectric insulation layer surrounding a conductor, and at least one waterproof adhesive layer applied on top of and preferably surrounding the electrical cable.

However, in the exemplary dual insulated electrical coil assembly 900, first winding layer 720 and second winding layer 730 are wound between two neutral connection ends 750 of the winding layer, and a single central phase connection end 740 of the winding layer. The two neutral connection ends 750 of the winding layer are located at either end of the magnetic core 702 and are closer to the neutral connection of the electrical phase circuit, such as neutral connection 550 of electrical machine 500. Conversely, the central phase connection end 740 of the winding layer is located in substantially the center of the magnetic core 702, and is closer to the phase connection of the electrical phase circuit, such as phase connection 520 of electrical machine 500. The second winding layer 730 is wound substantially adjacent to and in the same configuration as the first winding layer 720, resulting in multiple substantially parallel oriented winding layers around magnetic core 702. Similar to as in coil assembly 700 above, in such parallel oriented winding layers 720 and 730, the electrical potential difference between adjacent winding layers is substantially zero, which provides for minimized dielectric stress between adjacent electrical cables in each winding layer, and desirably reduces the risk of electrical fault between winding layers. However, in coil assembly 900, the maximum potential difference and therefore maximum dielectric stress between the winding layer 720 and the magnetic core 702 is adjacent to the phase connection end 740, located at the inner portion of the winding layer 720 near the center of magnetic core 702, while the outer portions of winding layer 720 adjacent to the neutral connection ends 750 are less dielectrically stressed. In this winding configuration, the relative dielectric stress, and therefore also the risk of dielectric failure and electrical fault, is reduced at the outsides of winding layer 720 and magnetic core 702. This may be particularly desirable for embodiments of the invention intended for submerged or flooded operation, such as in submarine electrical machines, given the propensity for water to penetrate the winding layer at the outside thereof, if water ingress into the winding layer 720 occurs. This potential water ingress site at the outside of the winding layer 720 favourably corresponds to the location of least dielectric stress in the winding configuration of coil assembly 900, therefore minimizing the potential for faults.

Figure 10:
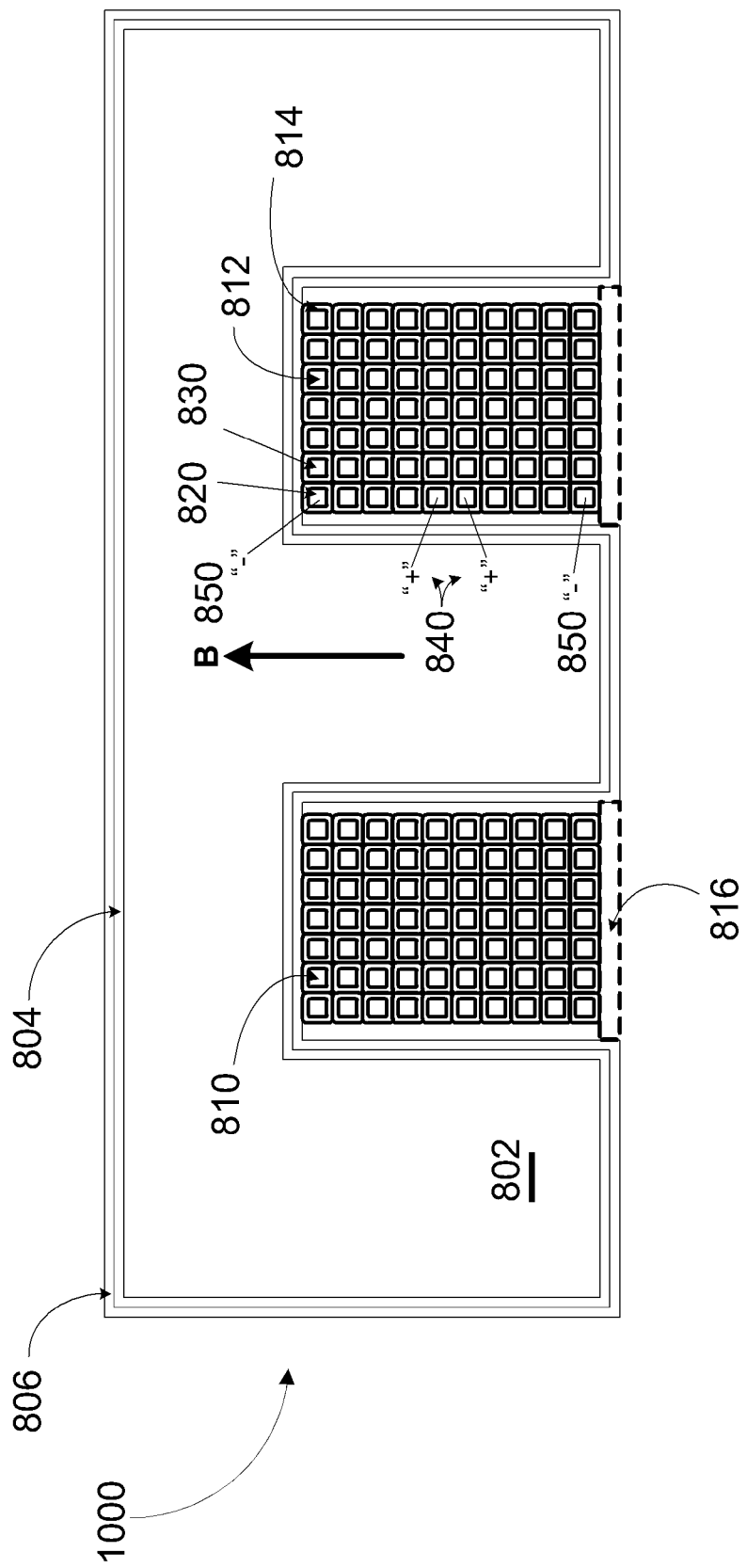
FIG. 10 is a cross sectional view of a dual insulated electrical coil assembly incorporating the third winding configuration illustrated in FIG. 9, according to an embodiment of the invention.

Referring to FIG. 10, a cross sectional view of a dual insulated electrical coil assembly 1000 incorporating the third winding configuration illustrated in FIG. 9 according to an embodiment of the invention is shown. Coil assembly 1000 is substantially similar to the dual insulated electrical coil assembly 800 as described above in reference to FIG. 8, and comprises magnetic core 802 and an electrical winding comprising at least two substantially parallel oriented electrical winding layers 820 and 830, which are wound around at least a portion of the magnetic core 802. The magnetic core 802 comprises at least one dielectric insulation layer 804 substantially surrounding the magnetic core 802 to provide protection against faults within the coil assembly 1000, and further comprises at least one waterproof adhesive layer 806 substantially surrounding and preferably adhered to the dielectric insulation layer 804, to provide protection against the ingress of water towards the magnetic core 802.

As described above in reference to coil assembly 800, electrical winding layers 820, 830 of coil assembly 1000 preferably comprise flexible electrical cable 810, comprising a central flexible conductive core 812, and at least one dielectric insulation layer 814 surrounding the conductive core 812 along the entire length of cable 810 to provide electrical insulation along the entire length of cable 810 and protect against electrical faults or shorts such as between magnetic core 802 and cable 810, or between turns of cable 810 in the winding of coil assembly 1000. The dielectric insulation layer 814 also preferably comprises a waterproof molecular barrier material, in order to provide protection against ingress of water through the dielectric insulation layer 814 into the cable 810, which may result in electrical fault or failure. The electrical winding layers 820, 830 additionally comprises at least one waterproof adhesive layer 816 applied on top of electrical cable 810, preferably surrounding and adhered to the exterior of electrical cable 810, and more preferably adhered to the dielectric insulation layer 814 of the electrical cable 810, to provide protection against the ingress of water towards the dielectric insulation layer 814, as described above in reference to coil assembly 800 in FIG. 8.

However, as shown in schematic coil assembly 900 in FIG. 9, the electrical winding layers 820, 830 in coil assembly 1000 are wound between two neutral connection ends 850 of the winding layer, and two central phase connection ends 840 of the winding layer. The two neutral connection ends 850 of each winding layer are located at each end of the wound portion of magnetic core 802 and are closer to the neutral connection of the electrical phase circuit, such as neutral connection 550 of electrical machine 500. Conversely, the two central phase connection ends 850 of each winding layer are located in substantially the center of the wound portion of magnetic core 802, and are closer to the phase connection of the electrical phase circuit, such as phase connection 520 of electrical machine 500. As similarly described in reference to coil assembly 800, the second winding layer 830 of coil assembly 1000 is wound substantially adjacent to and in the same configuration as the first winding layer 820, resulting in multiple substantially parallel oriented winding layers around magnetic core 802. In one embodiment, each winding layer 820 may preferably be wound from a single continuous length of electrical cable 810, thereby providing a winding layer 820 free of connectors or other breaks in the dielectric insulation layer 814 surrounding the conductor 812, and thereby desirably reducing the risk of electrical faults within winding layer 820. Also similar to as described above, in alternative embodiments directed to less-extreme applications it may be desirable to decrease the thickness of dielectric insulation layer 814 surrounding electrical conductor 812 of electrical cable 810, or to use magnetic wire 810 in place of electrical cable, such that the proportion of the electrical winding occupied by conductor 812 is increased, thus increasing the potential efficiency and power factor provided by the coil assembly 1000.

According to another aspect of the invention, a method of manufacturing the inventive electrical coil assemblies described above is provided. The method of manufacturing according to the present invention desirably provides for the sequential assembly and treatment steps required to produce the inventive electrical coil assemblies described above, and to provide the multiple aspects of protection against water ingress and electrical faults in the coil assembly that are desirable applications in electrically conductive and/or chemically aggressive environments.

Figure 11:
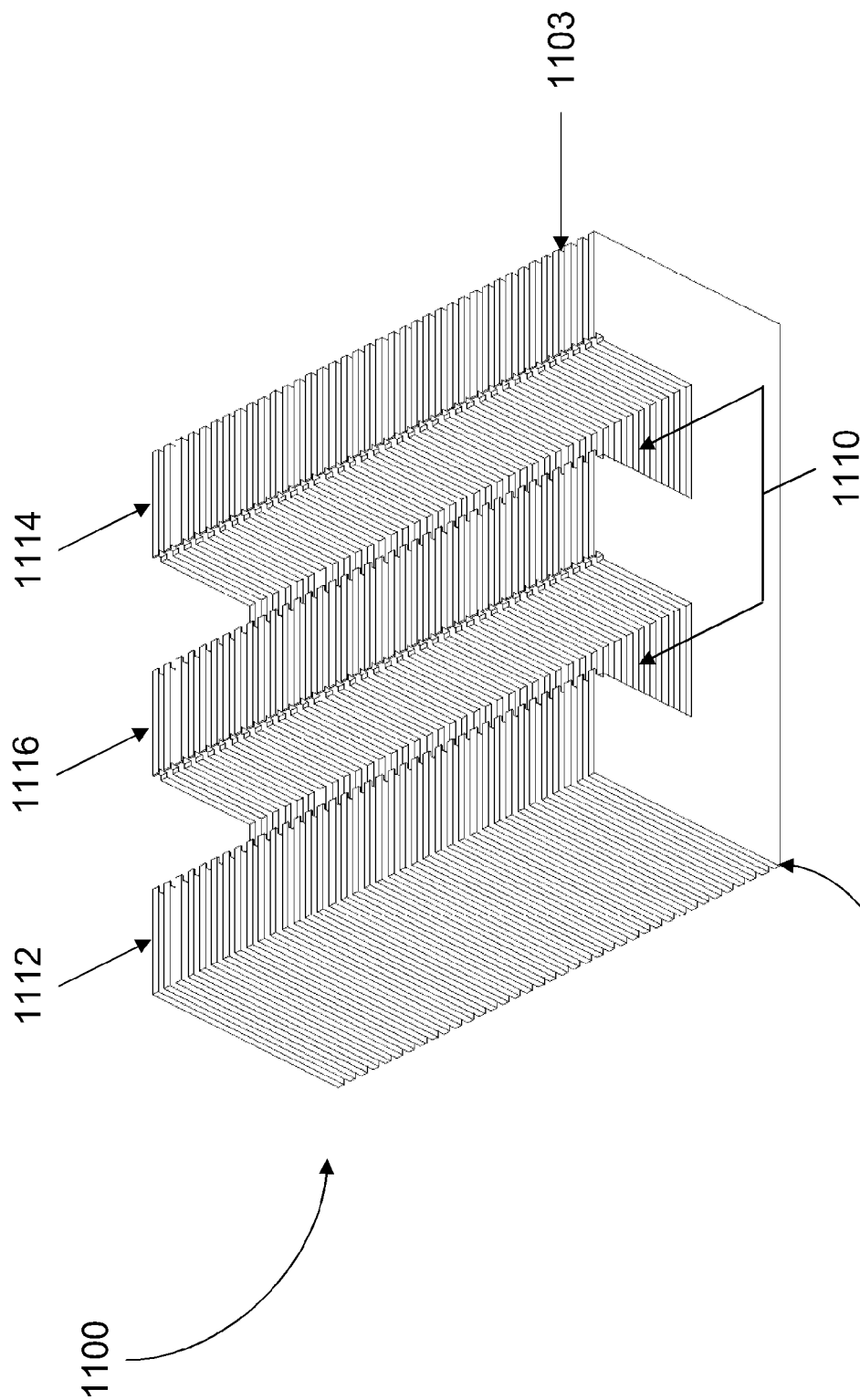
FIG. 11 is a perspective view of a magnetic core for a dual insulated electrical coil assembly according to an embodiment of the invention.

Referring now to FIG. 11, a perspective view is shown of a magnetic core for a dual insulated electrical coil assembly 1100 corresponding to a first stage of a method of manufacturing according to an embodiment of the invention. In such first stage a magnetic core 1102 is provided comprising multiple laminae of ferromagnetic material. The magnetic core 1102 shown in FIG. 11 is an exemplary "E-shaped" core element suitable for application in electrical machines such as electrical generators and/or motors for example, however, in other embodiments, magnetic cores of other known configurations may be used. Magnetic core 1102 comprises two outer core portions 1112 and 1114, and a central winding portion 1116 as shown. Corresponding winding channels 1110 are located between outer core portions 1112 and 1114 and central portion 1116, and are adapted to accommodate an electrical winding around the central portion 1116 of core 1102. The magnetic core 1102 may typically be constructed out of any suitable ferromagnetic material, such as electrical steel for example, which is commonly arranged in multiple substantially parallel laminae 1103 to form the magnetic core structure 1102. Magnetic core 1102 may be constructed according to any suitable technique known in the art.

Figure 12:
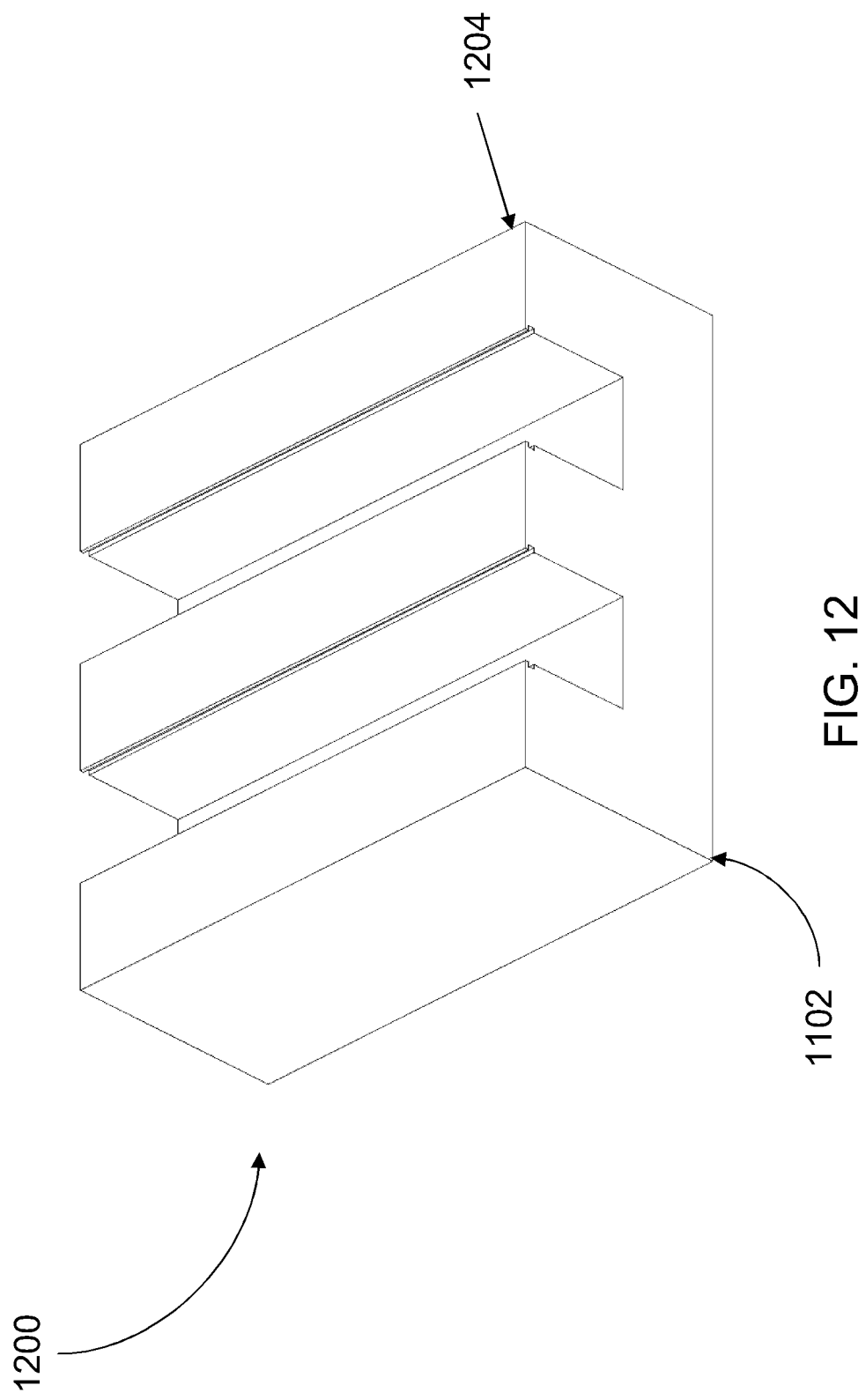
FIG. 12 is a perspective view of a dielectric coated magnetic core for a dual insulated electrical coil assembly according to an embodiment of the invention.

Referring to FIG. 12, a perspective view is shown of a dielectric coated magnetic core 1200 for a dual insulated electrical coil assembly corresponding to a second stage of a method of manufacturing according to an embodiment of the invention. In such second stage the magnetic core 1102 is coated with at least one layer of dielectric insulating material 1204. Preferably the at least one layer of dielectric insulating material 1204 completely surrounds the magnetic core 1102. Dielectric insulation layer 1204 may typically comprise an electrical resin layer, such as a layer of powder-coated electrical resin material typically used on magnetic core elements designed for conventional dry service. In some embodiments, magnetic core 1102 may be coated with multiple layers of one or more suitable dielectric insulating materials, such as to provide increased dielectric insulation and protection against electrical faults in magnetic core 1102. The one or more dielectric insulation layer 1204 may be coated on magnetic core 1102 by any suitable known technique, such as by powder coating, spraying, or dipping, for example.

Figure 13:
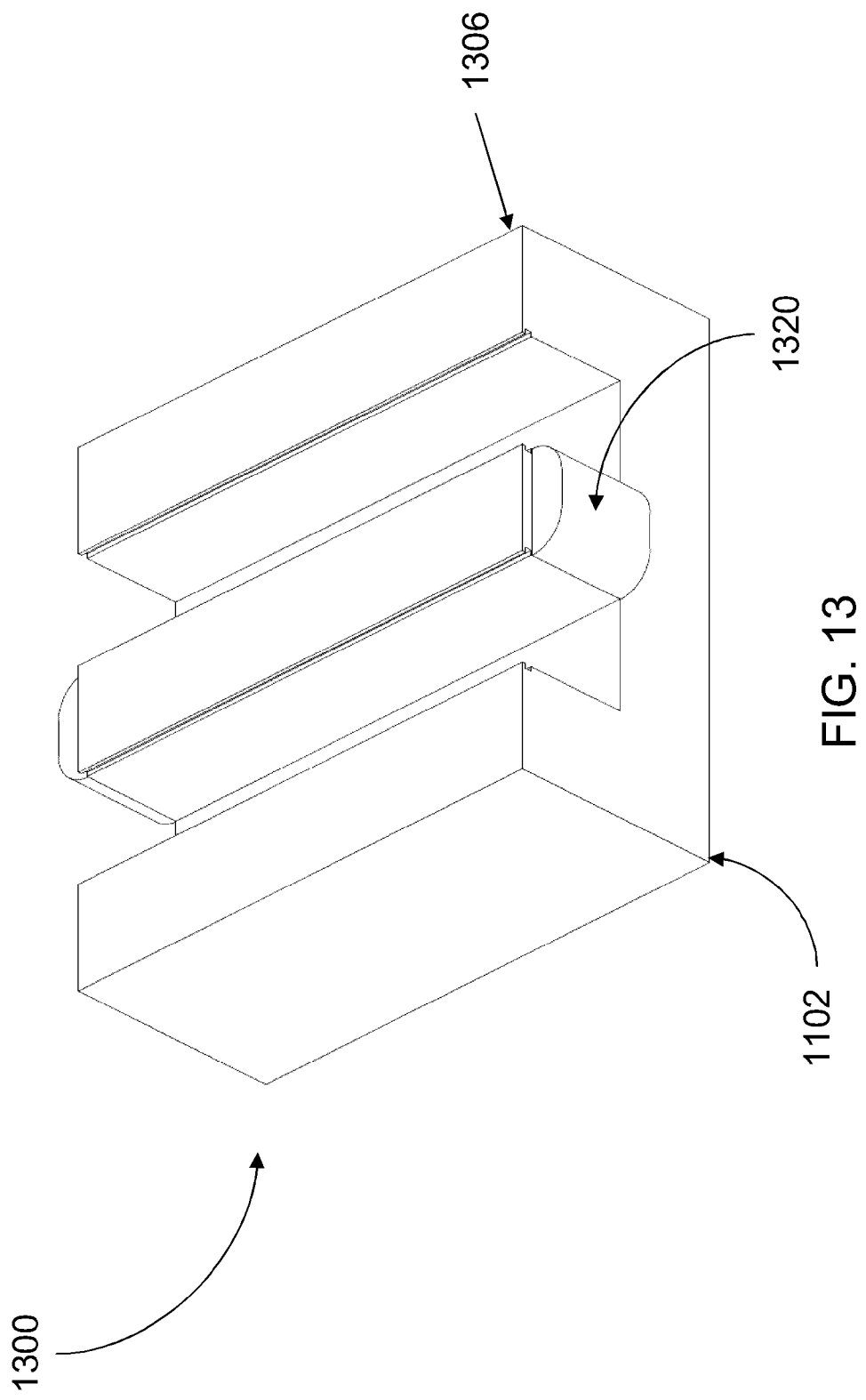
FIG. 13 is a perspective view of a waterproof coated magnetic core for a dual insulated electrical coil assembly according to an embodiment of the invention.

Referring to FIG. 13, a perspective view is shown of a waterproof coated magnetic core 1300 for a dual insulated electrical coil assembly according to a third stage of a method for manufacturing according to an embodiment of the invention. In such third stage, at least one layer of waterproof adhesive material 1306 is coated on the magnetic core 1102, over the at least one dielectric insulation layer 1204. Preferably the at least one layer of waterproof adhesive material 1306 completely surrounds and adheres to the underlying dielectric insulation layer 1204, to provide protection against the ingress of water towards the magnetic core 1102, and thereby provide protection against electrical faults in the magnetic core 1102, or between the magnetic core and other components of the electrical coil assembly. As described above in reference to FIG. 2, waterproof adhesive material layer 1306 may preferably form an adhesive waterproof film which provides protection against water ingress by blocking bulk water flow through layer 1306 by means of adhesive forces attaching layer 1306 to dielectric insulation layer 1204, and additionally by significantly reducing any slow diffusion or dispersion of water through layer 1306 itself. Waterproof adhesive material layer 1306 may typically comprise a waterproof epoxy paint system suited for marine use, such as a self-priming waterproof epoxy marine paint system comprising on or more coats or layers of one or more suitable epoxy-based adhesive waterproofing materials, for example. In a particular embodiment, suitable materials for use as waterproof adhesive material layer 1306 may comprise a multi-coat polyamide epoxy marine adhesive paint, and more particularly a two-component, high-build, polyamide adduct-cured epoxy marine adhesive paint, such as is sold commercially as Hempel™ 1763 formulation, by Hempel A S of Lyngby, Denmark. Waterproof adhesive material layer 1306 may be applied by any suitable known technique, such as by spray application, manual brush application, or dipped application, for example.

In an alternative embodiment, turn caps 1320 may optionally be attached to magnetic core 1102 prior to the application of waterproof adhesive material layer 1306, to provide a smooth turn radius and guide for the winding of the electrical winding around the magnetic core 1102. In such embodiment, turn caps 1320 may be constructed of any suitable and preferably insulating material, such as polyvinyl chloride, for example, and may be attached to magnetic core 1102 by any suitable known means such as by adhesive or mechanical fastening, for example.

Figure 14:
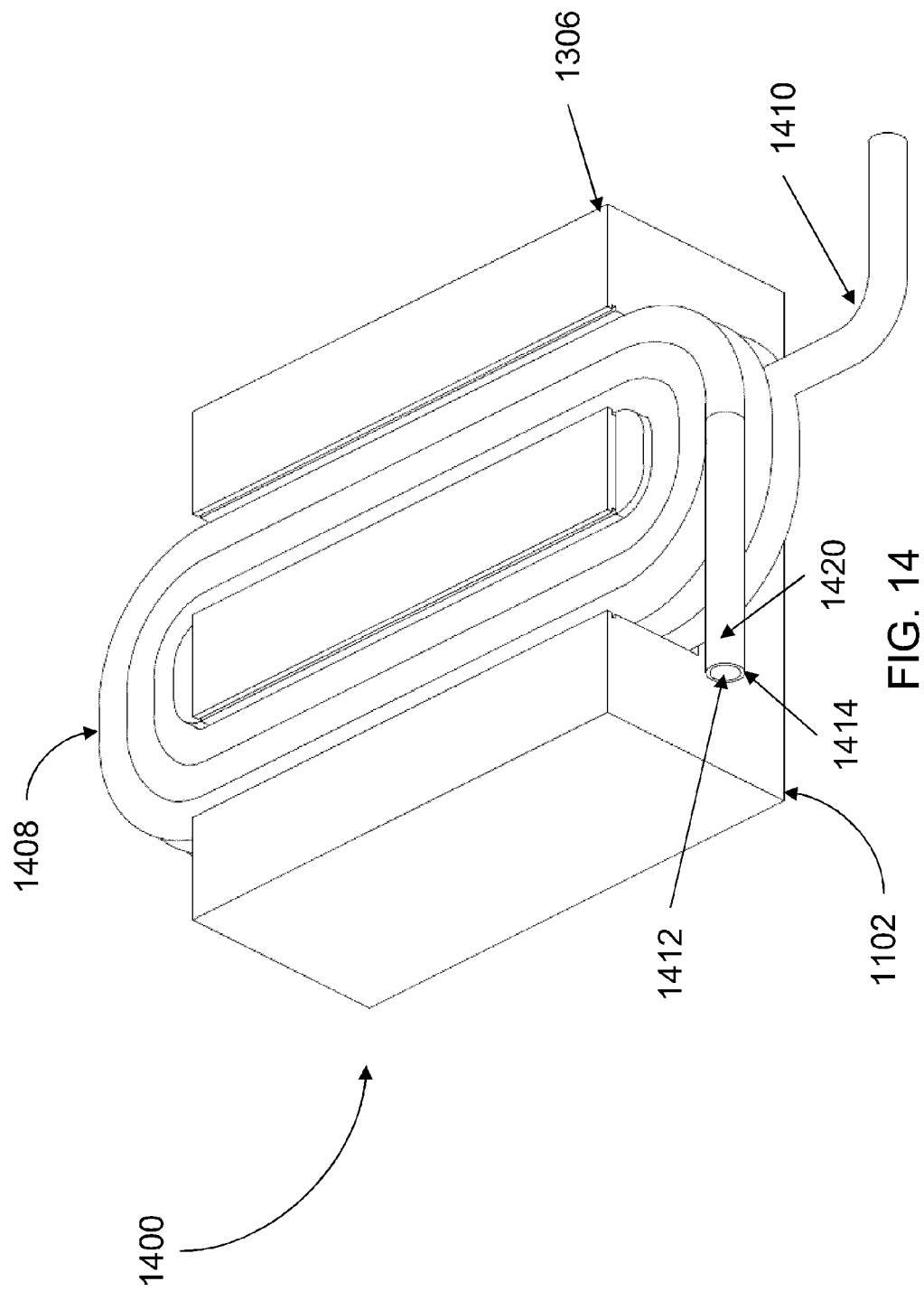
FIG. 14 is a perspective view of a magnetic core and winding for a dual insulated electrical coil assembly according to an embodiment of the invention.

Referring to FIG. 14, a perspective view is shown of a magnetic core and winding 1400 for a dual insulated electrical coil assembly according to a fourth stage of a method for manufacturing according to an embodiment of the invention. In such fourth stage, an electrical winding 1408 is wound around at least a portion of the magnetic core 1102. The electrical winding 1408 comprises an electrical cable comprising a central conductor 1412, and at least one layer of dielectric insulation 1414 surrounding the conductor 1412, where the dielectric insulation comprises a waterproof molecular barrier material. The central conductor 1412 may typically comprise copper or another suitable flexible conductive material, and the at least one dielectric insulation layer 1414 preferably surrounds the conductive core 1412 along the entire length of the electrical cable winding 1408 to provide electrical insulation and protect against electrical faults or shorts such as between magnetic core 1102 and cable 1410, or between turns of cable in winding 1408.

The dielectric insulation layer 1414 comprises a waterproof molecular barrier material in order to provide protection against ingress of water through the dielectric insulation layer 1414 into the electrical cable, and into contact with conductor 1412, which may result in fault or failure of winding 1408 and consequently of coil assembly 1400. As described above in reference to FIG. 2, dielectric insulation layer 1414 may comprise one or more suitable materials providing dielectric and waterproof molecular barrier properties, such as one or more of chlorosulfonated polyethylenes, cross-linked polyethylenes, and olefins, for example.

The electrical cable winding 1408 comprises at least first and second ends 1410 and 1420, and may be wound in any suitable configuration, such as the exemplary winding configurations described above in reference to FIGS. 6, 7, and 9. In one embodiment, the electrical winding 1408 is wound in multiple winding layers. In such an embodiment, each winding layer may preferably be wound from a separate continuous length of electrical cable, so that each winding layer is free of connectors or other breaks in the dielectric insulation layer 1414. In another embodiment, the electrical winding 1408 is wound in multiple winding layers, and each winding layer is wound from separate continuous length of electrical cable, and then the individual lengths of electrical cable are connected at their ends to connect the multiple winding layers in parallel connection.

Figure 15:
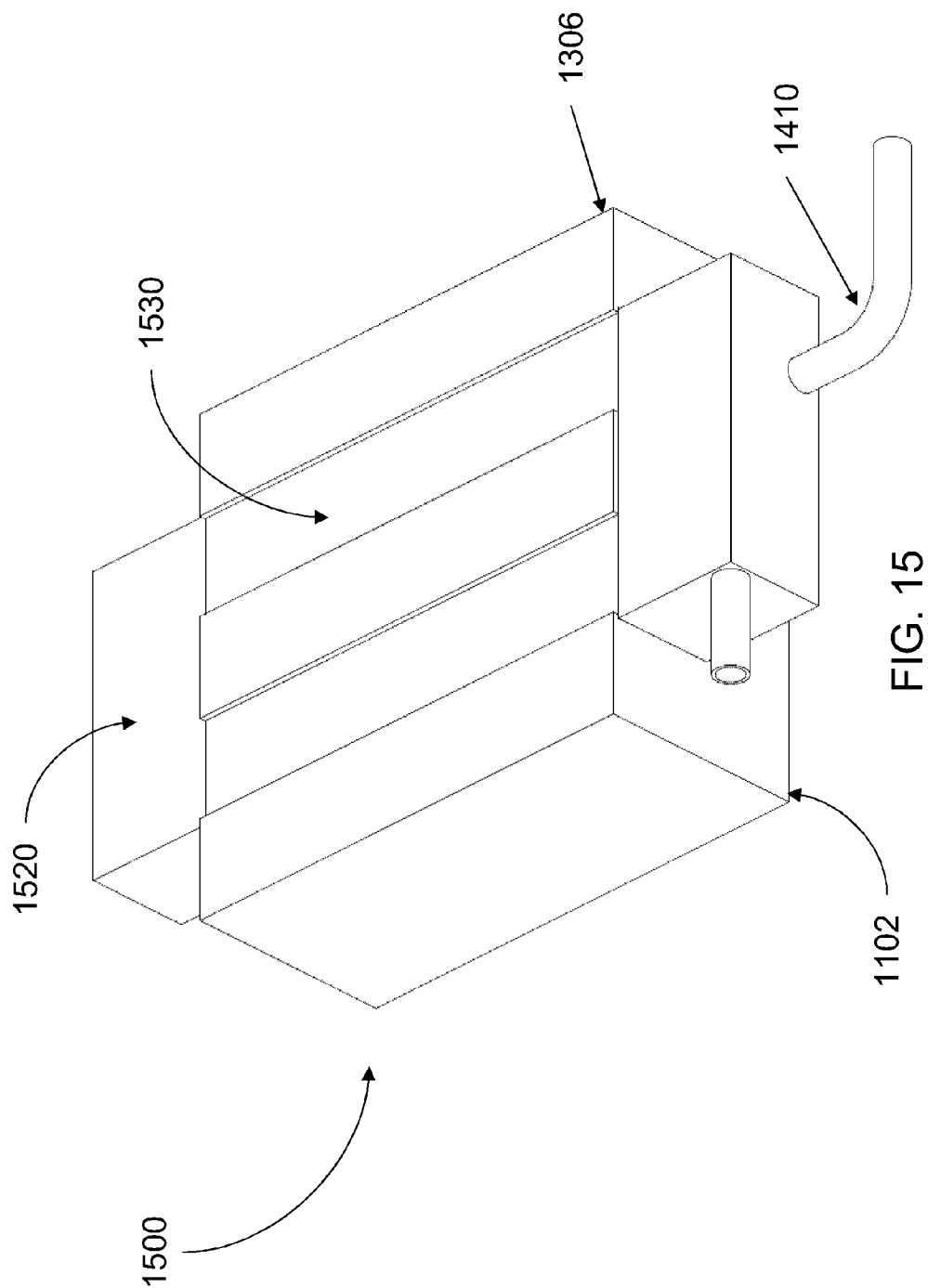
FIG. 15 is a perspective view of a magnetic core and encapsulated winding for a dual insulated electrical coil assembly according to an embodiment of the invention.

Referring to FIG. 15, a perspective view is shown of a magnetic core and encapsulated winding 1500 for a dual insulated electrical coil assembly according to a optional stage of a method for manufacturing according to an embodiment of the invention. In such optional stage, at least a portion of the electrical winding 1408 is encapsulated in an encapsulating material 1520. In an alternative embodiment, at least a portion of the magnetic core 1102 may be encapsulated in an encapsulating material 1520. An encapsulating material 1520 may be used to desirably provide additional electrical insulation and/or protection against ingress of water to the electrical winding 1408, and/or magnetic core 1102. Any suitable encapsulating material 1520 may be used, such as polyurethane resin or other curable materials that may be applied in a liquid or gel state, for example. The encapsulating material 1520 may be applied according to any suitable known technique to encapsulate at least a portion of the electrical winding 1408 and/or magnetic core 1102, such as by potting the encapsulating material into a mold situated around the encapsulated area and curing the encapsulating material in place, for example. In such embodiments, the encapsulating material 1520 may preferably be contained such that any required electrical components necessary to provide connections to the coil assembly 1500, such as winding end 1410, for example, are not sealed within the encapsulating material 1520.

In another embodiment, an optional stage of a method for manufacturing a dual insulated electrical coil assembly may comprise securing the electrical winding 1408 to the magnetic core 1102. In such embodiment, the electrical winding 1408 may be secured to the magnetic core by any suitable known technique, such as by installing a plate of dielectric material 1530 over a portion of the electrical winding 1408, for example. In such a case, the plate of dielectric material 1530 may comprise fiberglass, or another suitable dielectric material, for example. In an alternative embodiment, the electrical winding 1408 may be secured to the magnetic core 1102 by means of encapsulation of at least a portion of the electrical winding 1408 and magnetic core 1102 in an encapsulating material 1520.

Figure 16:
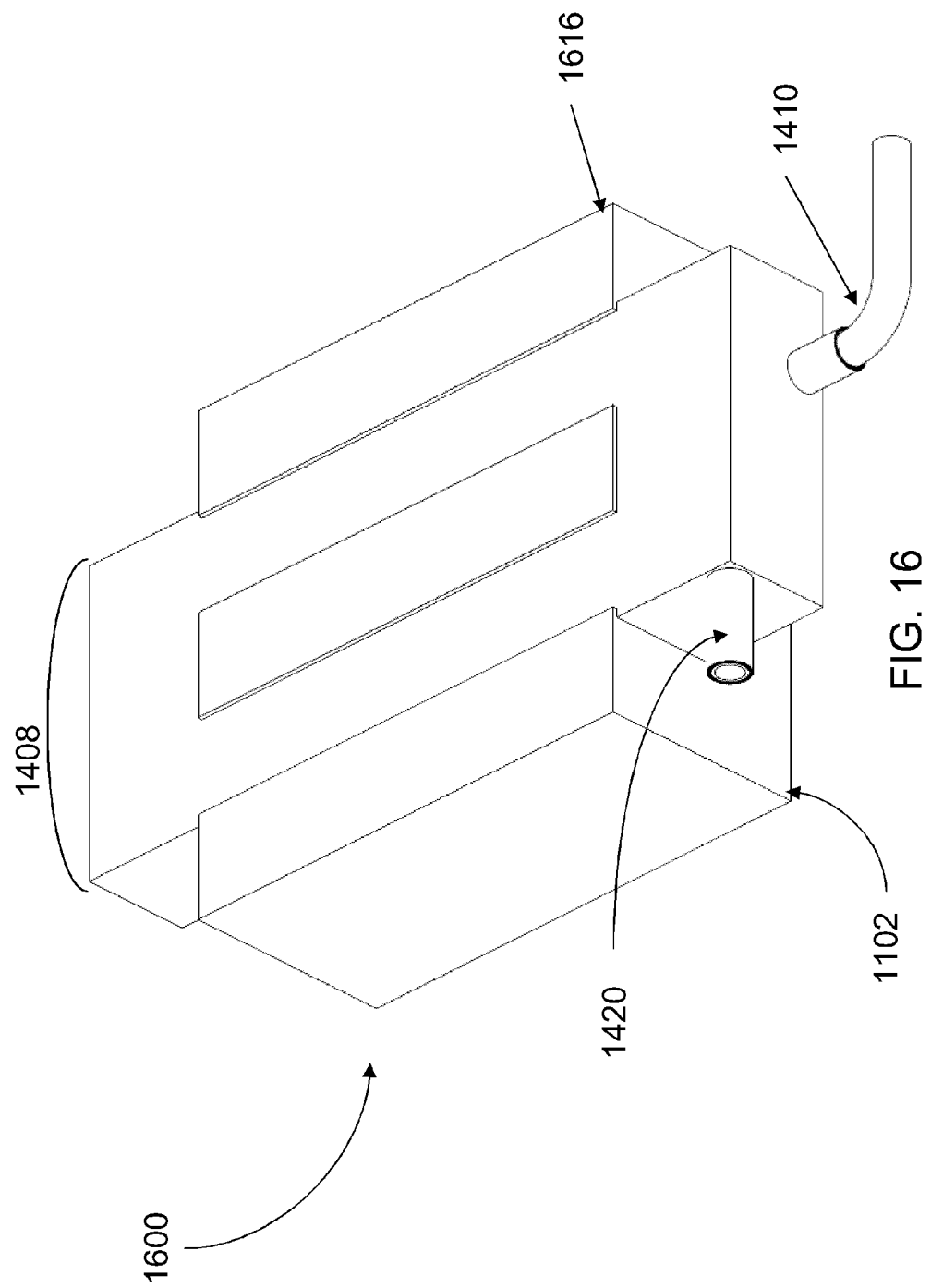
FIG. 16 is a perspective view of a complete waterproof coated dual insulated electrical coil assembly according to an embodiment of the invention.

Referring to FIG. 16, a perspective view is shown of a complete waterproof adhesive coated dual insulated electrical coil assembly 1600 according to a further stage of a method for manufacturing according to an embodiment of the invention. In such further stage, at least one layer of waterproof adhesive material 1616 is coated on the electrical winding 1408 and the magnetic core 1102. Preferably the at least one layer of waterproof adhesive material 1616 completely surrounds and adheres to the electrical cable of the electrical winding 1408, the magnetic core 1102, and any optionally encapsulated portion of either the winding 1408 or core, to provide protection against the ingress of water towards either the winding 1408 or core 1102, and thereby desirably provide protection against electrical faults in the winding 1408, magnetic core 1102, or between the core and winding of the electrical coil assembly 1600.

As described above in reference to FIG. 2, waterproof adhesive layer 1616 may preferably form an adhesive waterproof film which provides protection against water ingress by blocking bulk water flow through layer 1616 by means of adhesive forces attaching layer 1616 to electrical winding 1408 and magnetic core 1102, and additionally by significantly reducing any slow diffusion or dispersion of water through waterproof adhesive layer 1616 itself. Waterproof adhesive layer 1616 may typically comprise an adhesive waterproof epoxy paint system suited for marine use, such as a self-priming waterproof epoxy marine paint system comprising multiple coats or layers of one or more suitable epoxy-based adhesive waterproofing materials, for example. Suitable materials for use in waterproof adhesive layer 1616 may preferably be selected taking into account mechanical and chemical compatibility of the waterproof adhesive layer 1616 with the dielectric insulating layer of the underlying electrical winding 1408 to which it is adhered, thereby advantageously reducing the risk of cracking, tension or undesirable chemical reaction between electrical winding 1408 and waterproof adhesive layer 1616 which could lead to risks of water ingress and resultant electrical faults.

At least one layer of anti-fouling or fouling release paint such as self-priming waterproof anti-fouling or fouling release marine paint, for example, may also be applied as part of waterproof adhesive layer 1616, to advantageously provide protection against adhesion and fouling of the waterproof adhesive layer 1616 with biological contaminants in submerged marine and/or freshwater environments, as such biological contaminants could eventually result in the degradation or failure of the waterproof adhesive layer 1616. In a particular embodiment, suitable materials to be applied as waterproof adhesive layer 1616 may comprise a multi-coat polyamide epoxy marine adhesive paint, and more particularly a two-component, high-build, polyamide adduct-cured epoxy marine adhesive paint, such as is sold commercially as Hempel™ 1763 formulation, by Hempel A S of Lyngby, Denmark. Waterproof adhesive material layer 1616 may be applied by any suitable known technique, such as by spray application, manual brush application, or dipped application, for example. Preferably, waterproof adhesive layer 1616 is also applied to any length of electrical cable extending from coil assembly 1600, such as winding ends 1410 and 1420, for example, to provide protection against water ingress to such extending portions of electrical cable.

The inventive dual insulated electrical coil assemblies and electrical machines incorporating them described above may be suitable for use in many applications. In particular, the coil assemblies and electrical machines according to embodiments of the present invention may be suited to applications where exposure to electrically conductive and/or chemically aggressive media may be encountered, and more particularly, in applications involving repeated or protracted exposure to spray, flooding or submersion in fresh or seawater, for example. Such applications potentially include use in electrical generators exposed to or submerged in water and especially seawater, such as tidal, wave, and coastal or offshore wind power generation equipment. Additional applications potentially include use in electrical motors and/or generators for submerged service, such as in marine azimuthal propulsion systems, naval regenerative brake systems, pumps and/or turbines installed in-situ in pipelines and in-situ excavators or extractors for mining applications, for example. A further potential application includes use in electrical inductive equipment applied to submerged service, such as in underwater transformers, for example. Yet a further potential application includes use in electrical heating equipment applied to submerged service, such as in underwater direct heaters, for example.

The exemplary embodiments herein described are not intended to be exhaustive or to limit the scope of the invention to the precise forms disclosed. They are chosen and described to explain the principles of the invention and its application and practical use to allow others skilled in the art to comprehend its teachings.

As will be apparent to those skilled in the art in light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An electrical machine configured for flooded operation in an electrically conductive medium, comprising at least one coil assembly, said coil assembly comprising:
    at least one magnetic core element comprising at least one first dielectric insulation layer surrounding said core element, and at least one first waterproof adhesive layer surrounding said first dielectric insulation layer;
    at least one electrical winding around said magnetic core element, said electrical winding comprising:
        at least one continuous length of flexible electrical cable, said electrical cable comprising:
            a central conducting element;
            at least one second dielectric insulation layer surrounding said central conducting element, wherein said second dielectric insulation layer comprises at least one waterproof molecular barrier material;
        at least one second waterproof adhesive layer applied to said flexible electrical cable such as to substantially surround said flexible electrical cable.

2. The electrical machine according to claim 1, wherein said coil assembly comprises a plurality of electrical windings forming a plurality of electrical winding layers around said magnetic core element, and wherein each said electrical winding layer comprises a continuous length of flexible electrical cable.

3. The electrical machine according to claim 2, wherein said plurality of electrical winding layers are connected in parallel.

4. The electrical machine according to claim 1, comprising a stator element which comprises first and second sides, wherein each of said first and second sides comprises a plurality of said coil assemblies attached thereto, wherein said coil assemblies are connected in one or more groups to form one or more phases.

5. The electrical machine according to claim 4, wherein each said coil assembly in a first phase comprises a plurality of electrical windings forming at least first and second electrical winding layers around said magnetic core element, and wherein each said first electrical winding layer comprises a first continuous length of flexible electrical cable wound around each of said magnetic core elements of said coil assemblies in said first phase, and each said second electrical winding layer comprises a second continuous length of flexible electrical cable wound around each of said magnetic core elements of said coil assemblies in said first phase.

6. The electrical machine according to claim 5, wherein said electrical winding layers in said first phase are connected in parallel.

7. The electrical machine according to claim 1, wherein said second dielectric insulation layer comprises a waterproof molecular barrier material selected from the group comprising: chlorosulfonated polyethylenes, cross-linked polyethylenes, and olefins.

8. The electrical machine according to claim 1, wherein said first waterproof adhesive layer is adhered to said first dielectric insulation layer and said flexible electrical cable, and comprises a material selected from the group comprising: epoxy paints, self-priming marine paints, and anti-fouling or fouling release marine paints.

9. The electrical machine according to claim 1, wherein at least one of said first and second waterproof adhesive layer comprises a multi-coat polyamide epoxy marine adhesive paint.

10. The electrical machine according to claim 2, wherein each said coil assembly comprises between 4-10 electrical winding layers.

11. The electrical machine according to claim 4, wherein said stator element comprises between 3-6 phases.

12. The electrical machine according to claim 1, wherein said coil assembly additionally comprises a cured resin insulation layer encapsulating at least a portion of said electrical winding.

13. The electrical machine according to claim 1, wherein said coil assembly additionally comprises a cured polyurethane resin insulation layer encapsulating at least a portion of said magnetic core element.

14. The electrical machine according to claim 1, comprising multiple coil assemblies, wherein each coil assembly is at least one of: substantially physically, substantially magnetically, and substantially thermally decoupled from each other coil assembly.

15. An electrical coil assembly configured for flooded operation in an electrical machine, transformer or inductor, in an electrically conductive medium, said coil assembly comprising:
   at least one magnetic core element comprising at least one first dielectric insulation layer surrounding said core element, and at least one first waterproof adhesive layer surrounding said first dielectric insulation layer;
   at least one electrical winding around said magnetic core element, said electrical winding comprising:
      at least one continuous length of flexible electrical cable, said electrical cable comprising:
         a central conducting element;
         at least one second dielectric insulation layer surrounding said conducting element, wherein said second dielectric insulation layer comprises at least one waterproof molecular barrier material;
      at least one second waterproof adhesive layer applied to said flexible electrical cable such as to substantially surround said flexible electrical cable.

16. The electrical coil assembly according to claim 15, additionally comprising a plurality of electrical windings forming a plurality of electrical winding layers around said magnetic core element, and wherein each said electrical winding layer comprises a continuous length of flexible electrical cable.

17. The electrical coil assembly according to claim 16, wherein said plurality of electrical winding layers are connected in parallel.

18. The electrical coil assembly according to claim 15, wherein said second dielectric insulation layer comprises a waterproof molecular barrier material selected from the group comprising: chlorosulfonated polyethylenes, cross-linked polyethylenes, and olefins.

19. The electrical coil assembly according to claim 15, wherein said first waterproof adhesive layer is adhered to said first dielectric insulation layer and said flexible electrical cable, and comprises a material selected from the group comprising: epoxy paints, self-priming marine paints, and anti-fouling or fouling release marine paints.

20. The electrical coil assembly according to claim 15, wherein at least one of said first and second waterproof adhesive layer comprises a multi-coat polyamide epoxy marine adhesive paint.

21. The electrical coil assembly according to claim 16, wherein each said coil assembly comprises between 4-10 electrical winding layers.

22. A method of manufacturing an electrical coil assembly for flooded operation in an electrically conductive medium, comprising:
   providing a magnetic core comprising a plurality of laminae of ferromagnetic material;
   coating said magnetic core with at least one layer of dielectric insulating material;
   coating said dielectric insulating material with at least one first layer of waterproof adhesive material;
   winding an electrical winding around said magnetic core, said electrical winding comprising an electrical cable comprising a conductor, and at least one layer of dielectric insulation surrounding said conductor, wherein said dielectric insulation comprises at least one waterproof molecular barrier material;
   coating said electrical winding and said magnetic core with at least one second layer of waterproof adhesive material.

23. The method according to claim 22, additionally comprising:
   securing said electrical winding to said magnetic core before coating said electrical winding and said magnetic core.

24. The method according to claim 22, additionally comprising:
   encapsulating at least a portion of said electrical winding in a cured polyurethane resin insulating material.

25. The method according to claim 22, additionally comprising:
   encapsulating at least a portion of said magnetic core in a cured resin insulating material.

26. The method according to claim 22, wherein said winding comprises winding a plurality of electrical windings around said magnetic core to form a plurality of electrical winding layers, wherein each said electrical winding layer comprises an electrical cable comprising a conductor, and at least one layer of dielectric insulation wherein said dielectric insulation comprises at least one waterproof molecular barrier material.

27. The method according to claim 26, additionally comprising:
   connecting said plurality of electrical winding layers together in parallel.

28. The method according to claim 22, wherein said dielectric insulation comprises a waterproof molecular barrier material selected from the group comprising: chlorosulfonated polyethylenes, cross-linked polyethylenes, and olefins.

29. The method according to claim 22, wherein at least one of said first and second waterproof adhesive layer comprises a material selected from the group comprising: epoxy paints, self-priming marine paints, and anti-fouling marine paints.

30. The method according to claim 22, wherein said dielectric insulating material comprises an electrical resin.

31. The method according to claim 23, wherein said securing comprises securing said electrical winding to said magnetic core using a plate of dielectric material.

* * * * *